(12) United States Patent
Manu et al.

(10) Patent No.: US 7,580,570 B2
(45) Date of Patent: Aug. 25, 2009

(54) ACCURACY MODEL FOR RECOGNITION SIGNAL PROCESSING ENGINES

(75) Inventors: Mitica Manu, Sammamish, WA (US); Radmila Sarac, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1037 days.

(21) Appl. No.: 10/730,113

(22) Filed: Dec. 9, 2003

(65) Prior Publication Data
US 2005/0125225 A1 Jun. 9, 2005

(51) Int. Cl.
*G06K 9/00* (2006.01)

(52) U.S. Cl. ..................................... 382/181

(58) Field of Classification Search ................ 382/155, 382/156, 157, 158, 159, 160, 161, 181, 186, 382/187, 190, 224, 225, 226, 227, 228, 229; 704/200, 231, 232, 236, 242, 251, 255, 256, 704/256.1, 256.2; 706/15, 16, 20, 22, 25, 706/26, 27, 28, 31
See application file for complete search history.

(56) References Cited

U.S. PATENT DOCUMENTS

| | | | | |
|---|---|---|---|---|
| 3,601,811 A | * | 8/1971 | Yoshino | 706/25 |
| 5,091,780 A | * | 2/1992 | Pomerleau | 348/152 |
| 5,142,666 A | * | 8/1992 | Yoshizawa et al. | 706/38 |
| 5,687,291 A | * | 11/1997 | Smyth | 706/10 |
| 5,768,478 A | * | 6/1998 | Batten, Jr. | 706/43 |
| 6,151,574 A | * | 11/2000 | Lee et al. | 704/256 |
| 6,188,976 B1 | | 2/2001 | Ramaswamy et al. | |
| 6,285,785 B1 | * | 9/2001 | Bellegarda et al. | 382/187 |
| 6,484,133 B1 | * | 11/2002 | Vogt | 702/190 |
| 6,507,816 B2 | | 1/2003 | Ortega | |
| 6,539,351 B1 | * | 3/2003 | Chen et al. | 704/236 |
| 6,847,731 B1 | * | 1/2005 | Caulfield | 382/159 |
| 7,019,749 B2 | * | 3/2006 | Guo et al. | 345/473 |
| 7,136,710 B1 | * | 11/2006 | Hoffberg et al. | 700/83 |
| 7,167,587 B2 | * | 1/2007 | Ii et al. | 382/228 |
| 7,184,591 B2 | * | 2/2007 | Thiesson et al. | 382/186 |
| 7,272,561 B2 | * | 9/2007 | Miyazaki et al. | 704/256 |
| 2003/0068610 A1 | * | 4/2003 | Rzhetsky et al. | 435/4 |
| 2005/0049983 A1 | * | 3/2005 | Butler et al. | 706/13 |

OTHER PUBLICATIONS

N.A. Diamantidis et al., "Unsupervised stratification of cross-validation for accuracy estimation," Artificial Intelligence, vol. 116, pp. 1-16 (2000).

Sheng Gao et al., "A Maximal Figure-of-Merit Learning Approach to Text Categorization," SIGIR '03, Jul. 28-Aug. 1, 2003, Toronto, Canada, pp. 174-181.

B. Kumar et al., Performance Evaluation of Highly Concurrent Computers by Deterministic Simulation, Communications of the ACM, vol. 21, No. 11, pp. 904-913 (Nov. 1978).

Yu-Sheng Lai et al., "Meaningful Term Extraction and Discriminative Term Selection in Text Categorization via Unknown-Word Methodology," ACM Transactions on Asian Language Information Processing, vol. 1, No. 1, pp. 34-64 (Mar. 2002).

Bernhard Suhm et al., "Model-based and Empirical Evaluation of Multimodal Interactive Error Correction," CHI '99, Pittsburgh, PA, pp. 584-591 (May 1999).

A. Olecka, "Evaluating Classifiers' Performance in a Constrained Environment," Proceedings of the Eighth ACM SIGKDD International Conference on Knowledge Discovery and Data Mining (Jul. 2002).

* cited by examiner

*Primary Examiner*—Samir A. Ahmed
*Assistant Examiner*—Atiba O Fitzpatrick
(74) *Attorney, Agent, or Firm*—Shook Hardy & Bacon L.L.P.

(57) ABSTRACT

Signals to be processed are categorized based on signal characteristics such as physical aspects, context, conditions under which the signals were generated and source, and/or based on other variables. Categorized sets of signals are processed, and an accuracy for each set calculated. Weights are then applied to accuracy values for the sets, and the weighted values summed. In some cases, certain sums are then weighted and further summed.

28 Claims, 15 Drawing Sheets

ACCURACY MODEL FOR RECOGNITION SIGNAL PROCESSING ENGINES

FIELD OF THE INVENTION

The present invention relates to computer learning software used for, e.g., recognition of handwriting, speech and other forms of human input. In particular, the present invention relates to evaluating the accuracy of signal processing by such software.

BACKGROUND OF THE INVENTION

Computers accept human input in various ways. One of the most common input devices is the keyboard. Additional types of input mechanisms include mice and other pointing devices. Although useful for many purposes, keyboards and mice (as well as other pointing devices) sometimes lack flexibility. For these and other reasons, various alternative forms of input have been (and continue to be) developed. For example, electronic tablets or other types of electronic writing devices permit a user to provide input in a manner very similar to conventional writing. These devices typically include a stylus with which a user can write upon a display screen. A digitizer nested within the display converts movement of the stylus across the display into an "electronic ink" representation of the user's writing. The electronic ink is stored as coordinate values for a collection of points along the hne(s) drawn by the user. Speech is another alternative input form. Typically, the user speaks into a microphone, and the user's speech is digitized and recorded.

Before the information conveyed by speech or ink can be usefully manipulated by a computer, the speech or ink must usually undergo recognition processing. In other words, the graphical forms (ink) or sounds (speech) created by the user are analyzed by various algorithms to determine what characters (e.g., letters, numbers, symbols, etc.) or words the user intended to convey. Typically, the ink or speech is converted to Unicode, ASCII or other code values for what the user has recorded.

Various systems have been developed to recognize handwriting and speech input. In many cases, recognition algorithms involve isolating individual features of ink or speech input. These features are then compared to previously-generated prototype features. In particular, numerous samples of ink or speech are initially collected and used to create a database of prototype features against which an unknown ink or speech sample is compared. Based on the degree of similarity (or dissimilarity) between an input sample and one or more prototype features, one or more recognition results are generated for a particular user input.

Accuracy, or the closeness of a recognition result to what the user intended to convey, is an important criterion by which recognition systems are evaluated. For obvious reasons, a recognition engine must be reasonably accurate in order to be useful. However, "accuracy" is not easily defined or quantified. For example, a recognizer may work quite well in circumstance A, but not work well in circumstance B. Depending on what circumstances A and B are, this may or may not be significant. If a recognizer works well in circumstances that are very important to the end user, and only works poorly in circumstances that are of little consequence, the overall accuracy of the recognizer might be considered good. Conversely, a recognizer that provides highly accurate results in obscure circumstances but does not work well in more important circumstances might be considered inaccurate overall.

Accordingly, there remains a need for systems and methods of modeling the accuracy of signal processing engines used for, e.g., recognition of speech, handwriting and other complex forms of input.

SUMMARY OF THE INVENTION

The present invention addresses the above and other challenges associated with modeling the accuracy of a computer learning signal processing engine used for, e.g., handwriting or speech recognition. Signals to be processed are categorized based on signal characteristics such as physical aspects, context, conditions under which the signals were generated and source, and/or based on other variables. Categorized sets of signals are processed, and an accuracy for each set calculated. Weights are then applied to accuracy values for the sets, and the weighted values summed. In some cases, certain sums are then weighted and further summed.

In one illustrative embodiment, the invention includes a method for evaluating a computer learning signal processing engine. The method includes selecting a plurality of variables having values characterizing multiple signals to be processed. A first group of signal sets is identified, each signal set of the first group having an associated range of values for a variable of the plurality corresponding to the first group. An accuracy score for each signal set of the first group is calculated using the signal processing engine to be evaluated. Weight factors are applied to the accuracy scores for the first group signal sets. Each weight factor represents a relative importance of one of the associated ranges of values for the first variable. The weighted accuracy scores for first group signal sets are then summed to yield a first summed accuracy score. The method further includes identifying additional groups of signal sets, each group having a corresponding variable of the plurality of variables, each signal set of a group having an associated range of values for the corresponding variable. Accuracy scores for each signal set of each additional group are also calculated using the signal processing engine to be evaluated. Weight factors are applied to the accuracy scores for the signal sets of the additional groups. The weight factors within each of the additional groups represent relative importance of associated ranges of values for the variable corresponding to the group. The weighted accuracy scores within each of the additional groups are summed to yield additional summed accuracy scores, and the summed accuracy scores are further combined.

These and other features and advantages of the present invention will be readily apparent and fully understood from the following detailed description of various embodiments, taken in connection with the appended drawings.

DETAILED DESCRIPTION OF THE PREFERRED EMBODIMENTS

Embodiments of the invention provide a deterministic model for computing an overall accuracy value for computer learning signal processing systems, such as are used for handwriting or speech recognition. These systems are analyzed using numerous samples of user input. Various aspects of the samples and of the circumstances of the sample generation are identified. Accuracy values of the recognizer are then determined with regard to sets of the samples grouped by these identified aspects. These accuracy values are then weighted and combined to obtain an overall accuracy value for the recognizer (or other computer learning signal processing system). Although the invention is described using handwriting recognition and speech recognition as examples, this is only for purposes of illustrating operation of the invention. The invention is not limited to implementations related to handwriting and speech recognition.

Aspects of the invention may be implemented with program modules or other instructions that can be executed on a computing device. Generally, program modules include routines, programs, objects, components, data structures, etc. that perform particular tasks or implement particular abstract data types. Because the invention may be implemented using software, an example of a general purpose computing environment is included at the end of the detailed description of the preferred embodiments. Embodiments of the invention are in some instances described using examples based on user interfaces and software components found in the MICROSOFT WINDOWS XP Tablet PC Edition operating system ("XP Tablet") available from Microsoft Corporation of Redmond, Wash., as well as by reference to application programs used in conjunction with XP Tablet. However, any operating system or application program named is only provided so as to provide a convenient frame of reference for persons skilled in the art. The invention is not limited to implementations involving a particular operating system or application program.

Figure 1:
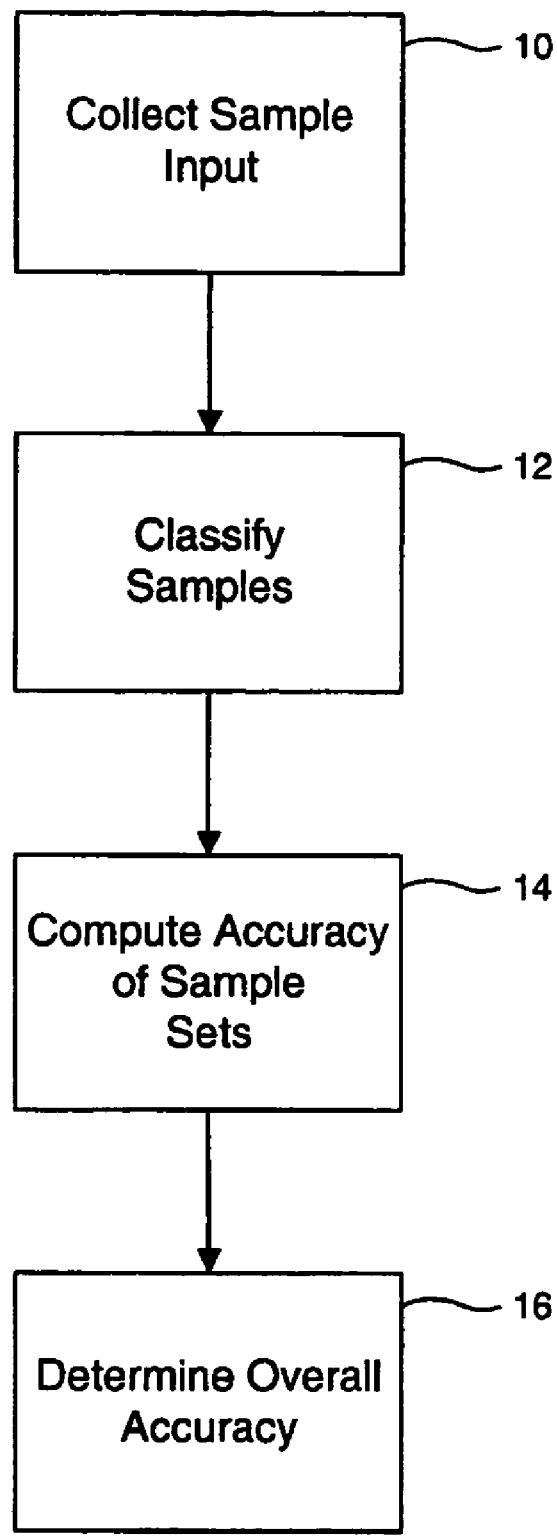
FIG. 1 is a block diagram illustrating operation of at least some embodiments of the invention.

FIG. 1 is a block diagram showing operation of at least some embodiments of the invention. In order to evaluate the accuracy of a recognition signal processing engine, sample input is needed. Although actual sample collection is not part of all embodiments of the invention, such collection is shown in FIG. 1 for purposes of explanation. As shown in block 10, sample inputs are collected for processing by a recognition engine to be evaluated. In the case of handwriting recognition, samples are obtained from a diverse group of users providing various types of input under various conditions. For example, handwriting samples are gathered from users having different demographic characteristics (e.g., male, female, age group, native language, etc.). In some cases, multiple users may be asked to write the same text. In other cases, different users in the same group may be asked to write different text. For example, one group of users may be asked for sample e-mail addresses, another group asked for sample text that might be input to a word processing program, etc. In some embodiments, the sample collection shown in block 10 is performed specifically for use in evaluating a particular recognition engine. In other embodiments, block 10 generically refers to input samples that have been previously collected and are used for evaluation of multiple recognition engines, or that have been obtained for other purposes and adapted to evaluation of a recognition engine. Notably, the invention is not restricted to implementations in which a single set of data is used to obtain an overall accuracy score. For example, data collection from various sources could be combined. Older pre-existing data could be augmented with additional data, collections of data gathered for various unrelated reasons could combined, etc. In at least one embodiment, data is collected using tools and environments other than those which will be used to implement a recognizer being evaluated.

Figure 2:
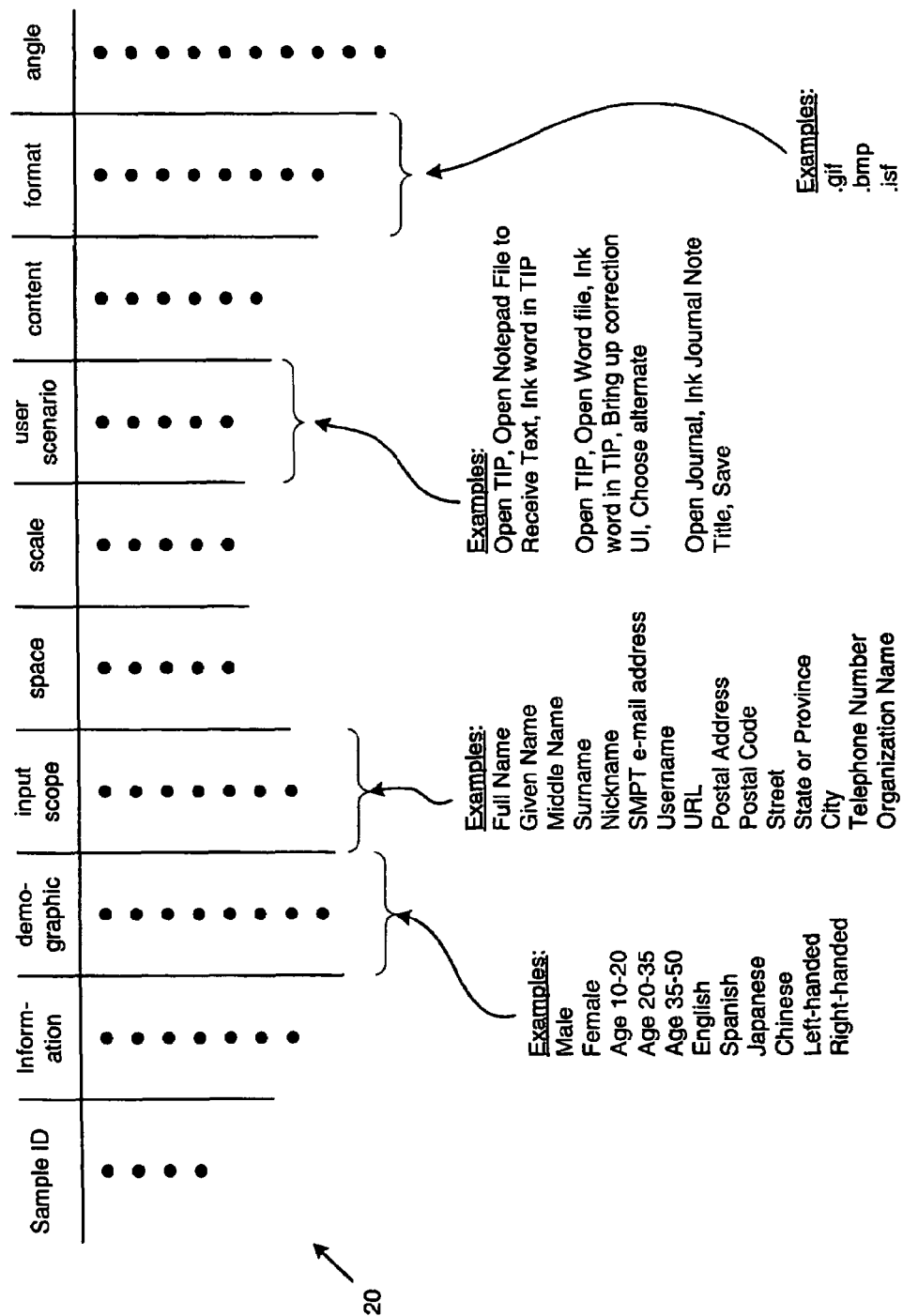
FIG. 2 is a table showing data used in at least one embodiment of the invention.

In block 12, collected input samples are classified according to numerous variables. Although shown as a separate block in FIG. 1 for convenience, the activities of blocks 10 and 12 could occur simultaneously. For example, as input samples are obtained, descriptive information about the sample could also be collected. FIG. 2 further illustrates collection and classification of sample inputs, and more specifically, sample handwriting input. Each row of table 20 corresponds to a different user input sample. Each column corresponds to a different variable used for accuracy analysis. Each cell of table 20 thereby contains a value for each sample for a particular variable. Actual values are not included in table 20; instead, the vertical dots indicate that numerous entries are contained in each column. Table 20 of FIG. 2 is for purposes of illustration, and an actual table is not necessarily generated in operation of the invention. However, data of the type shown in table 20, which data may be organized within a database or other data management program, is accessed in connection with at least some embodiments of the invention.

The first column of table 20 ("Sample ID") is merely an identifier of a sample, and may be a sequential record number assigned automatically as samples are collected and/or stored. The second column ("Information") corresponds to the actual information the user intends to convey with his or her handwriting. If the user is attempting to write an e-mail address, for example, the value for "Information" could be something in the form "emailrecipient@domainname.com".

The next column of table 20 corresponds to demographic data regarding the provider of the sample. For example, samples may be classified by sample provider gender, by age or age group (e.g., 10-20, 20-35, etc.), by native language, by whether the user is left- or right-handed, etc.

The next column of table 20 corresponds to the input scope of the sample. In many cases, the input scope is analogous to the context of the information the user is attempting to convey by writing. Possible values for input scope include full name, given name, middle name, surname, nickname, e-mail address, computer system username, an Internet Uniform Resource Locater (URL), a postal address, a postal code, a telephone number, etc. These are only examples, however, and a large number of other possibilities exist. For example, a particular recognition engine may be designed for use by medical personnel. In such a case, input scope values could include such things as patient name, drug name, drug dosage, etc.

The next column of table 20 corresponds to the spacing between components of the input sample. Some handwriting recognition engines use space between ink strokes (or collections of ink strokes) in connection with determining whether the user has written a separate letter, separate words, etc. Different individuals tend to write with different amounts of space between letters and/or words. Values for space could be in absolute terms (e.g., the number of pixels between separate stroke groupings) or could be relative (e.g., ratio of spacing between stroke groups to total length of ink). In some embodiments, spacing also has a temporal component, e.g., the delay between writing portions of an ink sample.

The next column corresponds to scaling of the input. In some embodiments, this variable relates to the size of the input. For example, a value for this variable may be the length, the height and/or the length/height ratio of an input sample. As another example, this variable may correspond to the amount by which an input sample is automatically enlarged or reduced as part of recognizer processing. More specifically, many recognition engines expand an electronic ink sample to fill a standard size area as part of feature extraction and comparison. In such a case, a scaling value may be the amount by which the original sample must be enlarged to fit within the standard area.

The next column corresponds to the user scenario in which the input is generated. In some embodiments, the user scenario includes the specific software application(s) used and/or the operations performed by the user in connection with creating the input. Examples of different user scenarios include:

User opens the Tablet PC Input Panel (TIP) of XP Tablet, user then opens a file in a text application to receive text input from the TIP, and user then creates an electronic ink word in the TIP and saves the ink in the opened file.

User opens a TIP, user then opens a file in a word processing application to receive the text results from the TIP, user then creates electronic ink in the TIP and sends same to the word processing application, user then instantiates and uses a correction user interface in the word processing application.

User opens a note-taking utility application (such as WINDOWS Journal utility of XP Tablet), user then creates an electronic ink note title, user then saves a file having the title as a file name.

User opens a note-taking utility application, user then creates an electronic ink paragraph, user then selects the paragraph, user then saves the ink paragraph as text.

The foregoing are merely examples, and numerous other user scenarios can be defined.

The next column corresponds to content, and represents various additional types of data regarding input samples. In some embodiments, values for content include identification of one or more software programs or program components from which the sample was obtained. In some embodiments, "content" may include the identity of a program that malfunctions during ink collection. In other embodiments, content values are associated with characteristics of a language model used by a recognizer. In still other embodiments, content values relate to aspects of the input suggesting that a user has used extra care to make the input neat and recognizable (e.g., writing in all capital letters).

The remaining columns of table 20 are labeled "format" and "angle." "Format" corresponds to the file format(s) in which the graphical and/or text components of an ink input is saved. Examples of file formats in which the graphical component of ink may be saved include bitmap files (.bmp), graphical interchange format files (.gif) and ink serialized format files (.isf). Examples of file formats in which text and/or metadata regarding ink may be saved include binary files (.bin), rich text format files (.rtf), hypertext markup language files (HTML) and extensible mark-up language files (XML). The angle column contains value(s) representing the angles between words, characters, or other ink strokes of an input sample.

The variables shown in table 20 are merely examples of types of information associated with a user input. In some embodiments, one or more of the variables in table 20 are not tracked or used for computation of an overall accuracy score. In other embodiments, different variables are recorded and used for computing an overall accuracy score. Various combinations and sub-combinations of one or more variables are also within the scope of the invention. For example, user input could be sorted based on multiple demographic factors: male users aged 10-20, female users who are native Japanese speakers, left-handed male users aged 20-35 who are native English speakers, etc.

Returning to FIG. 1, block 14 represents calculating the accuracy of a recognition engine as to sets of individual samples that are grouped by a particular variable. In at least one embodiment, the sets are grouped by values for the variables listed in table 20. For example, all of the input samples could be sorted by gender and handedness of the user, resulting in the following sets: right-handed females, left-handed females, right-handed males and left-handed males. A collective accuracy is then calculated for each of the four sets. Various measures of collective accuracy can be used. In one embodiment, collective accuracy for a set is computed according to Equations 1 through 3.

$$\text{Collective Accuracy} = \sum_{i=1}^{m} \eta_i * \left( A_i + \frac{1}{1+D_i} \right) \text{ where} \quad \text{(Equation 1)}$$

$$\sum_{i=1}^{m} \eta_i = \frac{1}{2m} \text{ and where} \quad \text{(Equation 2)}$$

$$A_i = \begin{cases} 1 & \text{if word is top recognizer result} \\ 0 & \text{otherwise} \end{cases} \quad \text{(Equation 3)}$$

The counter m in Equations 1 and 2 corresponds to the number of raw input words in a set provided to a recognizer for processing. Returning to the example of gender/handedness groupings, if collective accuracy is computed for each set, m for one set equals the total number of raw input words generated by right-handed females; some of the samples may be entire paragraphs, some may be a few words (e.g., a full name, an address, etc.) and some may only be a single word (e.g., an e-mail address). The term $D_i$ in Equation 1 is a distance function between the intended words (or characters or other components) in a set of user input samples and the results returned by the recognizer for those input samples. Often, a recognizer will return multiple results for an input, and $D_i$ for a set is computed as a real value between zero and ∞ (infinity). In at least one embodiment, $D_i$ is the sum, for an entire set, of the number of differences between an intended word (or word group) and all rearrangements of the results returned by the recognizer. In at least another embodiment, $D_i$ is a ratio of the number of recognition results for the words (or other components) of a set divided by the number of input words (or other components) in a set. In still other embodiments, $D_i$ is simply the ratio of the number of correctly recognized words (or characters or other components) in a set divided by the total number of words (or characters or other components) in a set. Various other measures of $D_i$ can be used.

The term $\eta_i$ (Equation 2) is a factor allowing introduction of weights for different words in multi-word groups, thereby placing more emphasis on words for which correct recognition is deemed to be more important. For example, a double $\eta_i$ value could be assigned to words that are the 1000 most-used words, are the 1000 most-suggested recognition results, etc.

As indicated by Equation 3, $A_i$ has a value of 1 if the correct recognition result for an input word is the first (or only) word suggested by a recognizer in a list of possible recognition results. Otherwise, $A_i$ has a value of 0. In other embodiments, Ai is calculated in a different manner. For example, $A_i$ in some embodiments equals 1 if the intended word is in the top N recognition results (where N is an integer), and is otherwise 0. In other embodiments, $A_i$ can have values between 0 and 1.

Figure 3:
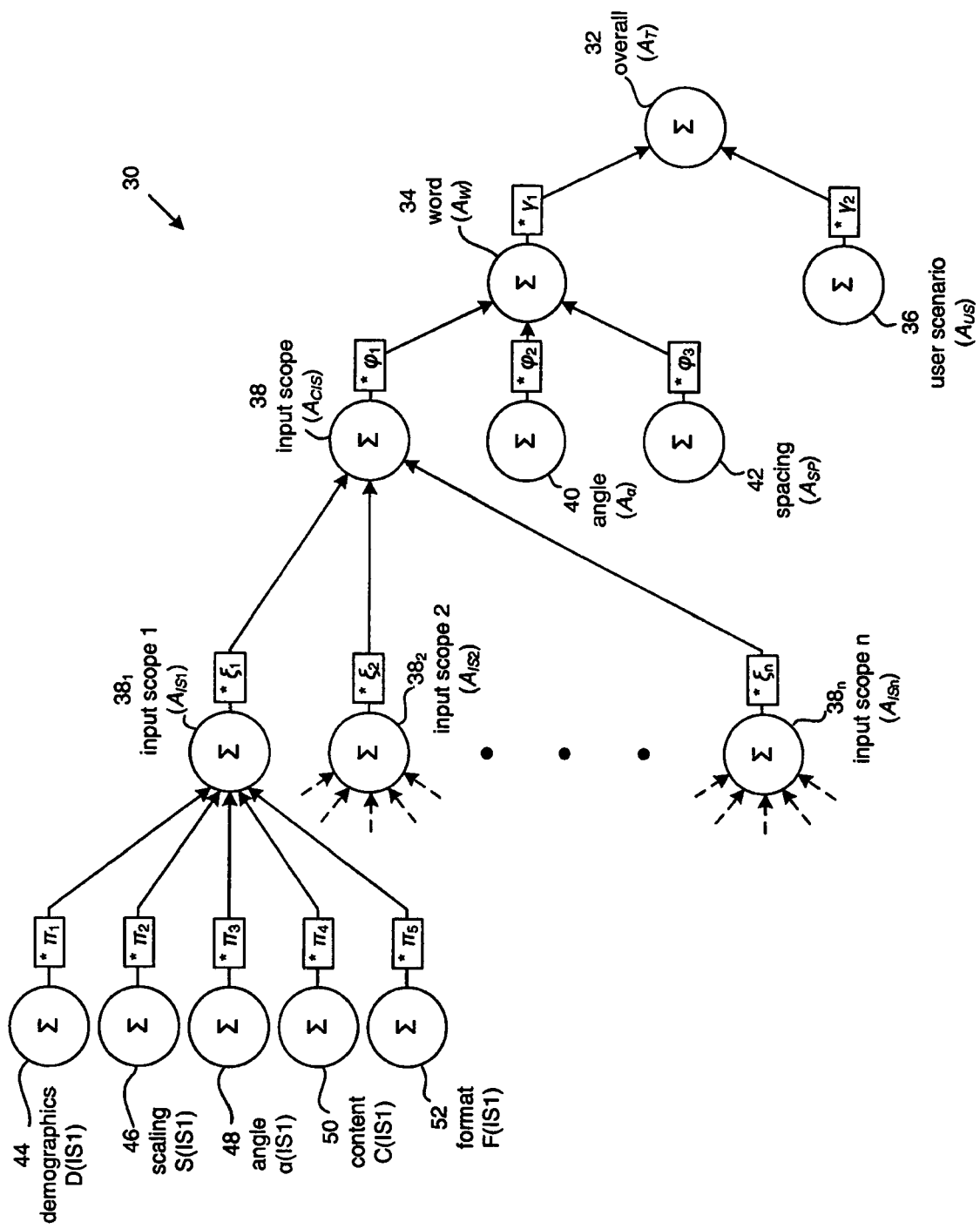
FIG. 3 is a diagram showing an accuracy model according to at least one embodiment of the invention.

Block 16 of FIG. 1 corresponds to calculation of an overall (or total) accuracy $A_T$ for a recognition (or other signal processing) engine. Overall recognizer accuracy is calculated using an accuracy model 30 such as is shown in FIG. 3. As explained below, inputs to accuracy model 30 include collective accuracy scores for sets (computed as described above), as well as weighting factors assigned to values for variables such as those listed in table 20 (FIG. 2). Accuracy model 30 of FIG. 3 is only one embodiment of an accuracy model according to the invention. As further described herein, many variations on the model of FIG. 3 are within the scope of the invention.

Beginning at the right side of FIG. 3, summation node 32 corresponds to the overall accuracy ($A_T$) score. $A_T$ is a weighted sum of two sub-components. In particular, $A_T$ is a sum of a word accuracy $A_W$ (computed in summation node 34) and user scenario accuracy $A_{US}$ (computed in summation node 36). Word accuracy $A_W$ is weighted by a factor $\gamma_1$ and user scenario accuracy $A_{US}$ is weighted by a factor $\gamma_2$. Word accuracy $A_W$, computed at node 34, is the weighted sum of three sub-components: combined input scope accuracy $A_{CIS}$ (computed at summation node 38), angle accuracy $A_\alpha$ (computed at summation node 40) and spacing accuracy $A_{SP}$ (computed at summation node 42). Combined input scope accuracy $A_{CIS}$ is weighted by the factor $\phi_1$, angle accuracy $A_\alpha$ is weighted by the factor $\phi_2$ and spacing accuracy $A_{SP}$ is weighted by the factor $\phi_3$.

Combined input scope accuracy $A_{CIS}$ is the weighted sum of accuracies for individual input scopes 1 through n computed at summation nodes $38_1$ through $38_n$. As used throughout this specification, "n" is a variable indicating an arbitrary number and does not necessarily represent the same value in all parts of model 30. In other words, n as used in one part of model 30 could represent a different arbitrary number than n as used in another part of model 30. Each individual input scope 1 through n is respectively weighted by factors $\xi_1$ through $\xi_n$. As shown by the vertical ellipsis between input scopes 2 through n, there may be many individual input scopes. Each input scope is a weighted sum of five accuracy sub-components: demographics (computed at summation node 44), scaling (computed at summation node 46), angle (computed at summation node 48), content (computed at summation node 50) and format (computed at summation node 52). As explained in more detail below, each of the five accuracy subcomponents of an input scope corresponds to an accuracy score for a particular input scope. Each input scope 2 through n would have the same five accuracy subcomponents, but for the input scopes corresponding to nodes $38_2$ through $38_n$. Each of the demographic, scaling, angle, content and format accuracy sub-components of an input scope is weighted by respective factors $\pi_1$ through $\pi_5$.

Figure 4:
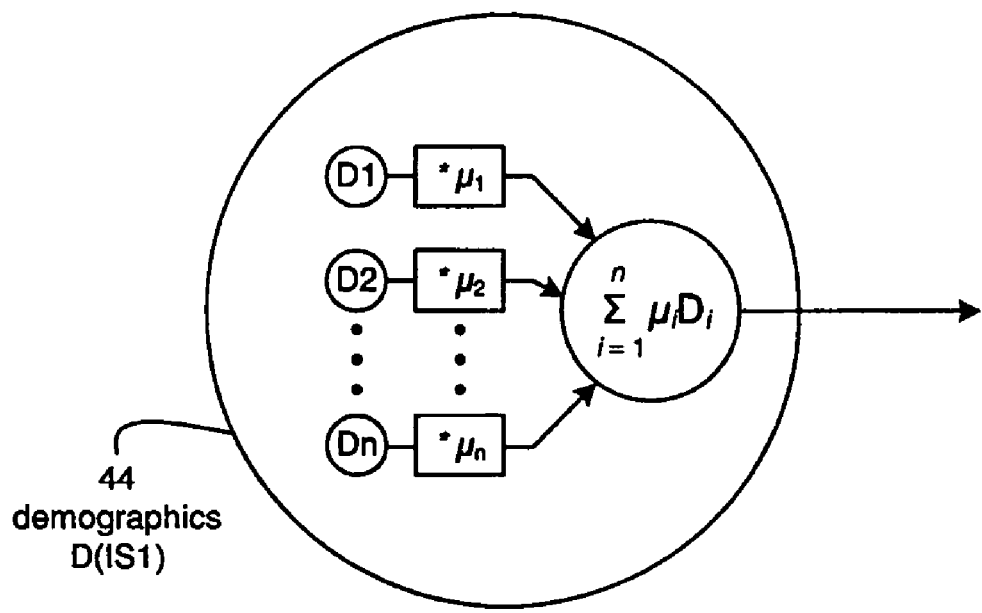
FIGS. 4-15 are diagrams showing additional details of nodes of the accuracy model of FIG. 3.

FIG. 4 further illustrates calculation of demographic accuracy (for input scope 1) at node 44. All input samples in a sample database (such as table 20 of FIG. 2) corresponding to input scope 1 are identified. For example, if input scope 1 is a postal address, all of the samples in which the user intended to write a postal address are identified. The identified samples are sorted into sets based on values for the demographic variable. Returning to a previous example, all input samples in which the user intended to write a postal address are in one embodiment sorted into four sets: right-handed females, left-handed females, right-handed males and left-handed males. Using, e.g., the formulae of Equations 1 through 3, a collective accuracy is then calculated for each set. The calculated collective accuracy for each set is then provided as an input (D1, D2, . . . Dn) to the calculation of D(IS1), the demographic accuracy D for input scope 1.

Each of these inputs is weighted by a respective weighting factor $\mu_1$ through $\mu_n$. Weighting factors $\mu_1$ through $\mu_n$, which may be determined in a variety of manners, total 1.0. In at least one embodiment of the invention, weights applied to inputs to a node of an accuracy model are based on the relative importance of the inputs to that node. In many cases, the weights are a function of the utility and/or the relevance (as perceived by a user) of a particular input. Weights may be determined based on user research, on usability studies, on product planning, on technical factors of a recognizer or its target software or hardware environment, or on numerous other factors (or combinations of factors). Additional examples are provided below.

In the case of the demographic variable in the example of FIGS. 3 and 4, each weighting factor represents the relative importance assigned to a particular demographic value. For example, a particular recognition engine may be targeted for implementation in a software product for which it is estimated that 75% of the customers will be female. Using values for overall percentages of the general population who are right handed (% right) versus left-handed (% left), weighting factors $\mu$ for node 44 could be computed as follows: $\mu_1$ (right-handed females)=0.75* (% right); $\mu_2$ (left-handed females)= 0.75*(% left); $\mu_3$ (right-handed males)=0.25* (% right); and $\mu_4$ (left-handed males)=0.25*(% left). In other embodiments, weighting factors may be based on criteria other than a target market for a product and/or calculated in a different manner. After multiplying by a weighting factor $\mu$, the collective accuracies D1-Dn for the sets are summed according to Equation 4.

$$\text{Demographic accuracy (input scope 1)} = D(IS1) \quad \text{(Equation 4)}$$
$$= \sum_{i=1}^{n} \mu_i D_i$$

The counter n in Equation 4 corresponds to the number of demographic value sets into which samples having input scope 1 are sorted. In the previous example of right- and left-handed males and females, n=4.

Figure 5:
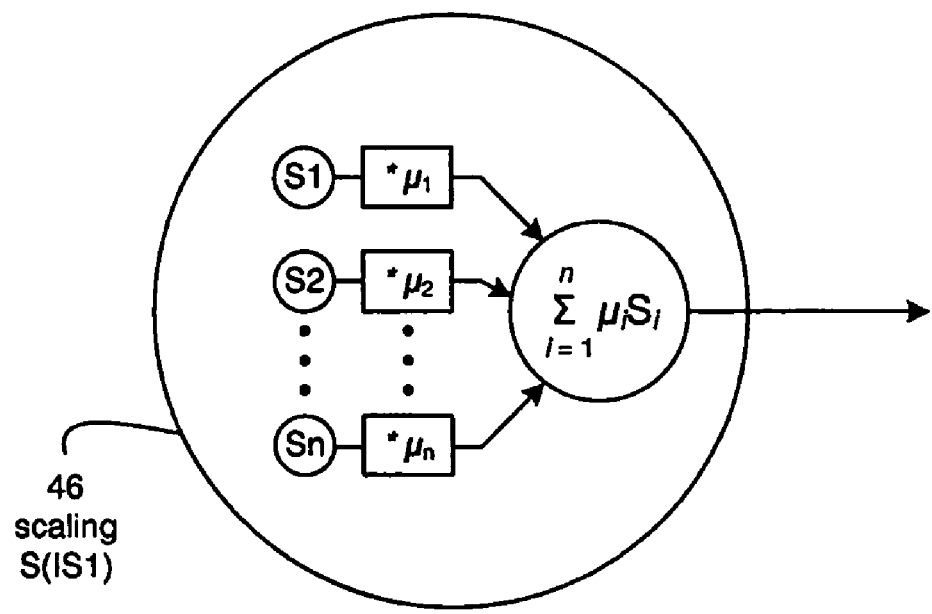

FIG. 5 illustrates calculation of scaling accuracy for input scope 1 at node 46. Notably, samples in the database of table 20 have multiple different characteristics; the recognition accuracy for a given sample may thus be included in the inputs to more than one node of model 30 (FIG. 3). All identified input samples corresponding to input scope 1, which inputs were previously sorted based on demographic values, are sorted into sets based on values (or ranges of values) for the scaling variable. For example, one set may correspond to samples scaled by factors between 1.0 and 1.1, another set to samples scaled by factors of 1.1 to 1.3, etc. Collective accuracy is then calculated for each set. The calculated collective accuracy for each set is then provided as an input (S1, S2, . . . Sn) to the calculation of S(IS1), the scaling accuracy S for input scope 1. Each of these inputs is then weighted by a respective weighting factor $\mu_1$ through $\mu_n$. Weighting factors $\mu_1$ through $\mu_n$, which may be different from the weighting factors $\mu_1$ through $\mu_n$ used for other nodes, may also be determined in a variety of manners, and will also total 1.0. In the present example, each weighting factor represents the relative importance assigned to a particular value for scaling of an input sample. For example, a particular recognition engine may be targeted for implementation in a software product for which research shows most users write with relatively small letters, resulting in larger scaling by the recognizer. In such a case, higher values of scaling could be assigned a larger weight. Again, weighting factors may be based on criteria other than a target market for a product. As but one example, specific digitizer or other hardware with which a recognizer is used may suffer loss of resolution at higher scaling values, requiring assignment of a certain weight to higher scaling values. After multiplying by a weighting factor $\mu$, the collective accuracies S1-Sn for the sets are summed according to Equation 5.

$$\text{Scaling accuracy (input scope 1)} = S(IS1) \qquad \text{(Equation 5)}$$
$$= \sum_{i=1}^{n} \mu_i S_i$$

The counter n in Equation 5 corresponds to the number of scaling value sets into which samples having input scope 1 are sorted.

Figure 6:
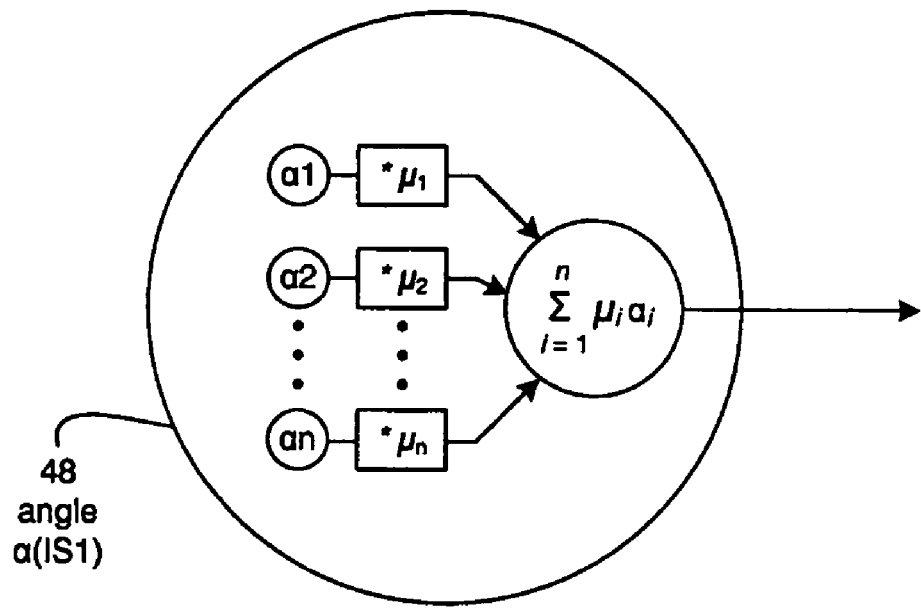

FIG. 6 illustrates calculation of angle accuracy for input scope 1 at node 48. All identified input samples corresponding to input scope 1 are sorted into sets based on values (or ranges of values) for the angle variable. In one embodiment, the value for the angle variable is the angle between adjacent words relative to the x axis in an (x,y) coordinate system. Collective accuracy is then calculated for each set. The calculated collective accuracy for each set is then provided as an input ($\alpha 1, \alpha 2, \ldots \alpha n$) to the calculation of $\alpha(IS1)$, the angle accuracy $\alpha$ for input scope 1. Each of these inputs is weighted by a respective weighting factor $\mu_1$ through $\mu_n$. Weighting factors $\mu_1$ through $\mu_n$, which may be different from the weighting factors $\mu_1$ through $\mu_n$ used for other nodes, may also be determined in a variety of manners, and will also total 1.0. In the present example, each weighting factor represents the relative importance assigned to a particular value for angle(s) of an input sample. For example, data may show that a majority of users tend to write with a particular range of angles between words, and values within that range may be assigned a larger weight. As before, weighting factors may be based on criteria other than a target market for a product. After multiplying by a weighting factor $\mu$, the collective accuracies $\alpha 1$-$\alpha n$ for the sets are summed according to Equation 6.

$$\text{Angle accuracy (input scope 1)} = \alpha(IS1) = \sum_{i=1}^{n} \mu_i \alpha_i \qquad \text{(Equation 6)}$$

The counter n in Equation 6 corresponds to the number of angle value sets into which samples having input scope 1 are sorted.

Figure 7:
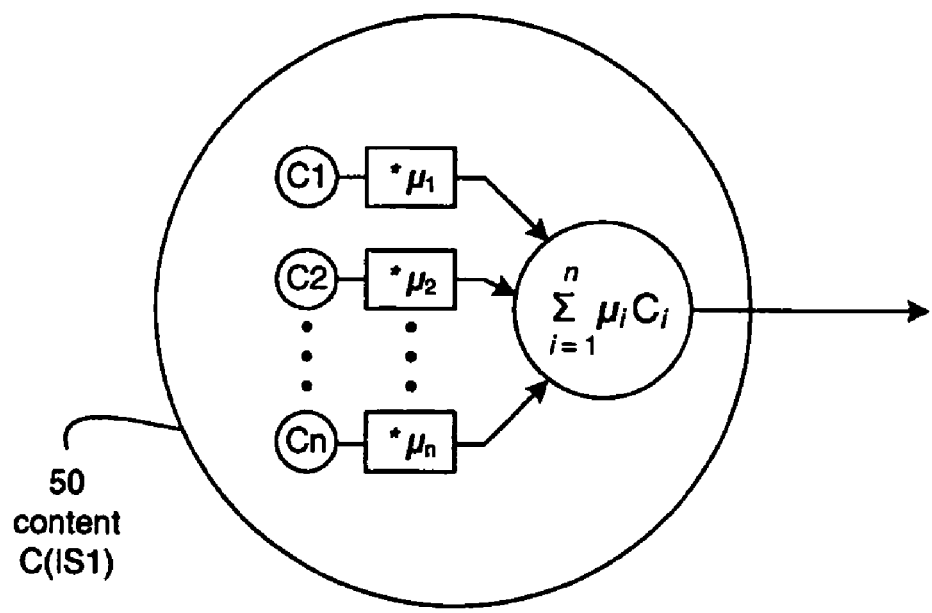

FIG. 7 illustrates calculation of content accuracy for input scope 1 at node 50. All identified input samples corresponding to input scope 1 are sorted into sets based on values (or ranges of values) one or more content variables. Collective accuracy is then calculated for each set. The calculated collective accuracy for each set is then provided as an input (C1, C2, ... Cn) to the calculation of C(IS1), the content accuracy C for input scope 1. Each of these inputs is weighted by a respective weighting factor $\mu_1$ through $\mu_n$. Weighting factors $\mu_1$ through $\mu_n$, which may be different from the weighting factors $\mu_1$ through $\mu_n$ used for other nodes, may also be determined in a variety of manners, and will also total 1.0. Each weighting factor represents the relative importance assigned to a particular value for a given content variable or variable combination. After multiplying by a weighting factor $\mu$, the collective accuracies C1-Cn for the sets are summed according to Equation 7.

$$\text{Content accuracy (input scope 1)} = C(IS1) \qquad \text{(Equation 7)}$$
$$= \sum_{i=1}^{n} \mu_i C_i$$

The counter n in Equation 7 corresponds to the number of content value sets into which samples having input scope 1 are sorted.

Figure 8:
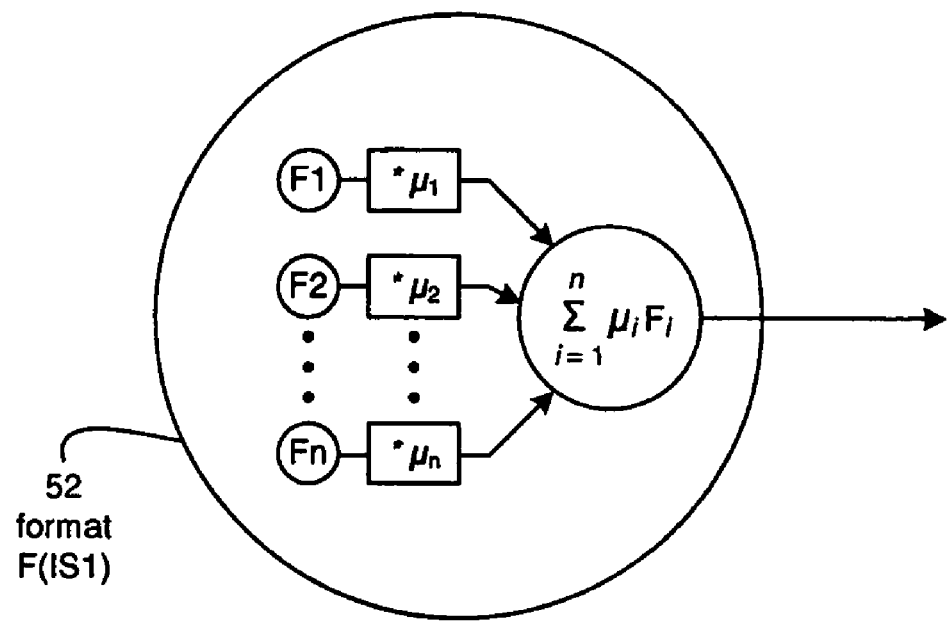

FIG. 8 illustrates calculation of format accuracy for input scope 1 at node 52. All identified input samples corresponding to input scope 1 are sorted into sets based on value(s) of one or more format variables. For example, one set may include samples stored in graphic format Q and text format R, another set may include samples stored in graphic format Q and text format P, etc. Collective accuracy is then calculated for each set. The calculated collective accuracy for each set is then provided as an input (F1, F2, ... Fn) to the calculation of F(IS1), format accuracy F for input scope 1. Each of these inputs is weighted by a respective weighting factor $\mu_1$ through $\mu_n$. Weighting factors $\mu_1$ through $\mu_n$, which may be different from the weighting factors $\mu_1$ through $\mu_n$ used for other nodes, may also be determined in a variety of manners, and will also total 1.0. In the present example, each weighting factor represents the relative importance assigned to a particular value for a format variable or variable combination. For example, one file format (or file format combination) may predominate for technical or marketing reasons, and thus be given a larger weight. After multiplying by a weighting factor $\mu$, the collective accuracies F1-Fn for the sets are summed according to Equation 8.

$$\text{Format accuracy (input scope 1)} = F(IS1) \qquad \text{(Equation 8)}$$
$$= \sum_{i=1}^{n} \mu_i F_i$$

The counter n in Equation 8 corresponds to the number of format value sets into which samples having input scope 1 are sorted.

Figure 9:
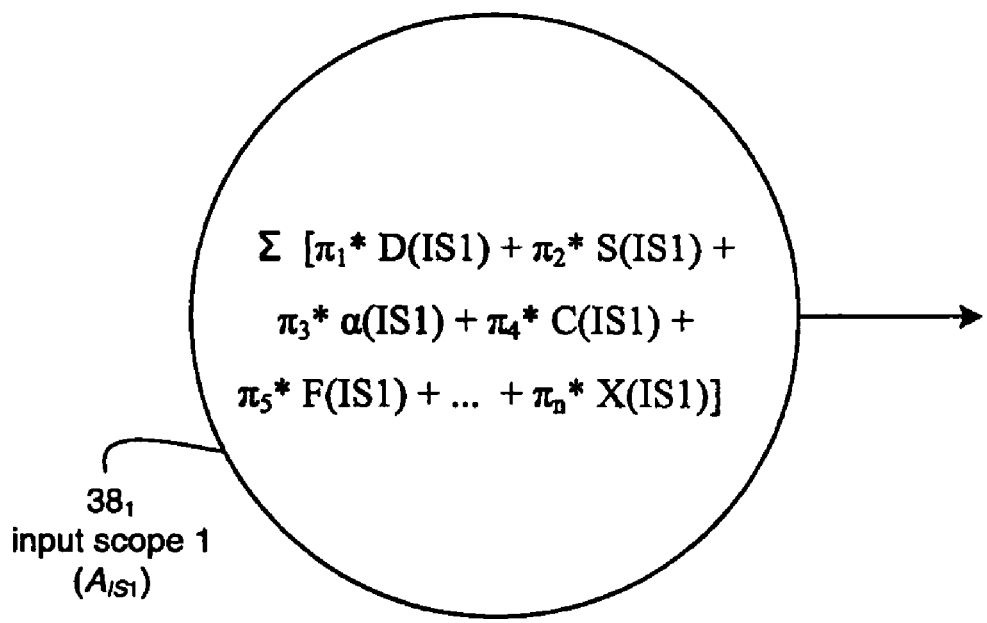

FIG. 9 illustrates calculation of accuracy for input scope 1 ($A_{IS1}$) at node $38_1$. In particular, node $38_1$ sums the weighted outputs of nodes 44 (demographic accuracy D(IS1)), 46 (scaling accuracy S(IS1)), 48 (angle accuracy $\alpha$(IS1)), 50 (content accuracy C(IS1)) and 52 (format accuracy F(IS1)), as shown in Equation 9.

$$A_{IS1} = \Sigma[\pi_1 * D(IS1) + \pi_2 * S(IS1) + \pi_3 * \alpha(IS1) + \pi_4 * C(IS1) + \pi_5 * F(IS1) + \ldots + \pi_n * X(IS1)] \qquad \text{(Equation 9)}$$

The accuracies D(IS1), S(IS1), $\alpha$(IS1), C(IS1) and F(IS1) are weighted by respective weight factors $\pi_1$ through $\pi_5$. Each weight $\pi$ corresponds to an importance assigned to a particular accuracy subcomponent of input scope 1. If, for example, accuracy for input scope 1 varies widely among different demographic sets, but varies little among sets based on angle between adjacent words, demographic accuracy $D_{IS1}$ could be assigned a larger weight relative to angle accuracy $\alpha_{IS1}$. Equation 9 includes additional terms beyond those supplied by nodes 44 through 52. In particular, Equation 9 continues with the expansion "+ ... +$\pi_n$*X(IS1)". As discussed in more detail below, other embodiments may have additional accuracy subcomponents for each input scope (shown generically as X(IS1)) weighted by a separate weighting factor ($\pi_n$). In the embodiment of FIG. 3, there are no other sub-components (i.e., $\pi_6$ through $\pi_n$ equal 0). As with the weighting factors $\mu$ at each of nodes 44 through 52, the values of $\pi_1$ through $\pi_n$ total 1.0.

Accuracies for additional input scopes 2 ($A_{IS2}$, node $38_2$) through n ($A_{ISn}$, node $38_n$) are calculated in a similar manner. Specifically, samples corresponding to a particular input scope are identified, and accuracy sub-components D(IS), S(IS), $\alpha$(IS), C(IS) and F(IS) calculated as described with regard to nodes 44 through 52. Notably, when calculating the accuracy subcomponents for a different input scope, the individual weighting factors at a particular node may change. In other words, $\mu_1$ for D(IS1) may have a different value than $\mu_1$ for D(IS2). The weighting factors $\mu_1$ through $\mu_n$ for each node will still total 1.0, however. The accuracy sub-components D(IS), S(IS), $\alpha$(IS), C(IS) and F(IS) are then multiplied by weighting factors $\pi_1$ through $\pi_5$. As with weighting factors for the same sub-component in different input scopes, the weighting factors $\pi_1$ through $\pi_5$ may also have different values for a different input scope. In other words, $\pi_1$ for input scope 1 may have a different value than $\pi_1$ for input scope 2. The weighting factors $\pi_1$ through $\pi_n$ for each input scope will total 1.0.

Figure 10:
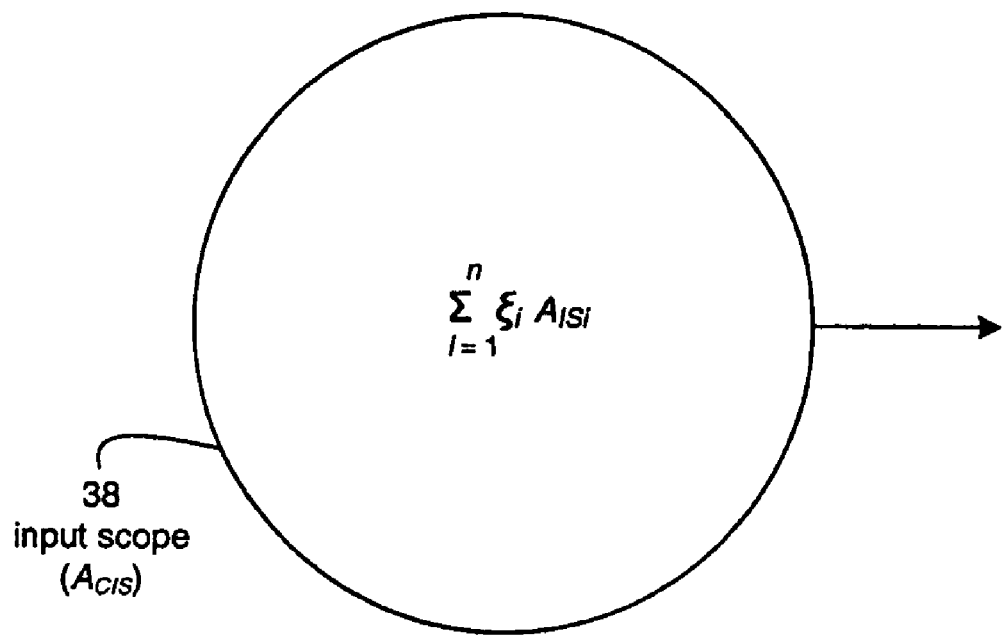

FIG. 10 illustrates calculation of combined input scope accuracy $A_{CIS}$ at node 38. Node 38 sums the weighted outputs of nodes $38_1$ through $38_n$, as shown in Equation 10.

$$A_{CIS} = \sum_{i=1}^{n} \xi_i A_{ISi} \quad \text{(Equation 10)}$$

The counter n in Equation 10 corresponds to the number of input scope accuracies provided as inputs to node 38. Each input scope accuracy $A_{ISi}$ is weighted by respective weight factors $\xi_1$ through $\xi_n$. Each weight $\xi$ corresponds to an importance assigned to a particular input scope. For example, a recognizer targeted for use in an application program used mainly for e-mail could heavily weight e-mail addresses and other input scopes related to e-mail. The weighting factors $\xi_1$ through $\xi_n$ for each input scope will total 1.0.

Figure 11:
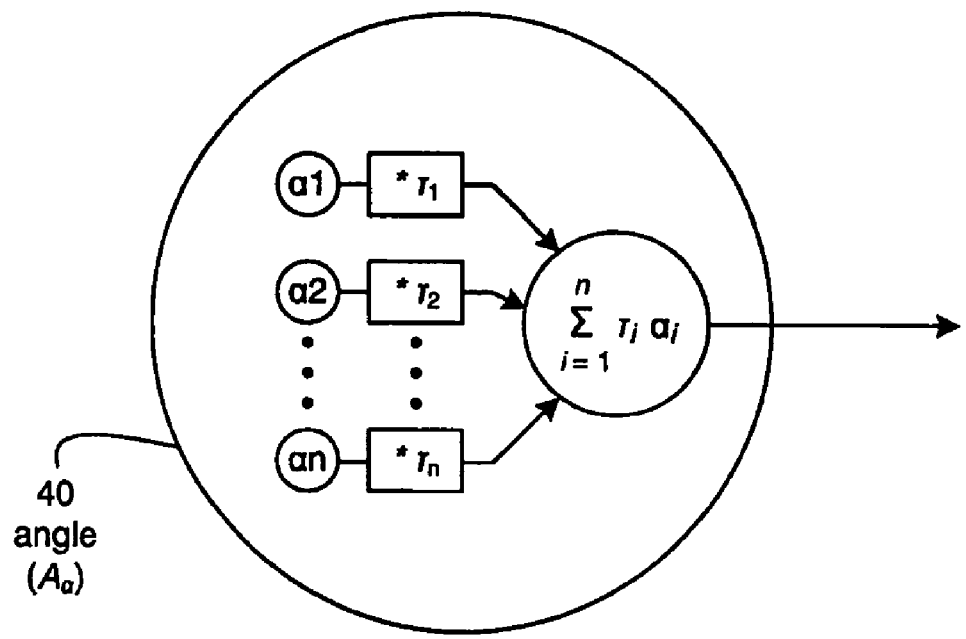

FIG. 11 illustrates calculation of angle accuracy $A_\alpha$ at node 40. Node 40 calculates angle accuracy similar to node 48, but is not restricted to a specific input scope. All input samples are sorted into sets based on values (or ranges of values) for the angle variable. The sets may or may not be based on the same values (or value ranges) used for angle accuracy calculation for a specific input scope. Collective accuracy is then calculated for each set. The calculated collective accuracy for each set is then provided as an input ($\alpha$1, $\alpha$2, ... $\alpha$n) to the angle accuracy calculation for all input scopes. Each of these inputs is weighted by a respective weighting factor $\tau_1$ through $\tau_n$. Weighting factors $\tau_1$ through $\tau_n$ total 1.0. Each weighting factor $\tau$ represents the relative importance assigned to a particular value for an angle between words across different input scopes. Weighting factors $\tau_1$ through $\tau_n$ may be determined in a variety of manners. For example, data may show that a majority of users tend to write with a particular range of angles between words in many different input scopes, and values within that range may be assigned a larger weight. As before, weighting factors may be based on criteria other than a target market for a product. After multiplying by a weighting factor $\tau$, the collective angle accuracy $\alpha$ for each of the sets is summed according to Equation 11.

$$\text{Angle accuracy (all input scopes)} = A_\alpha = \sum_{i=1}^{n} \tau_i \alpha_i \quad \text{(Equation 11)}$$

The counter n in Equation 11 corresponds to the number of angle value sets into which samples are sorted.

Figure 12:
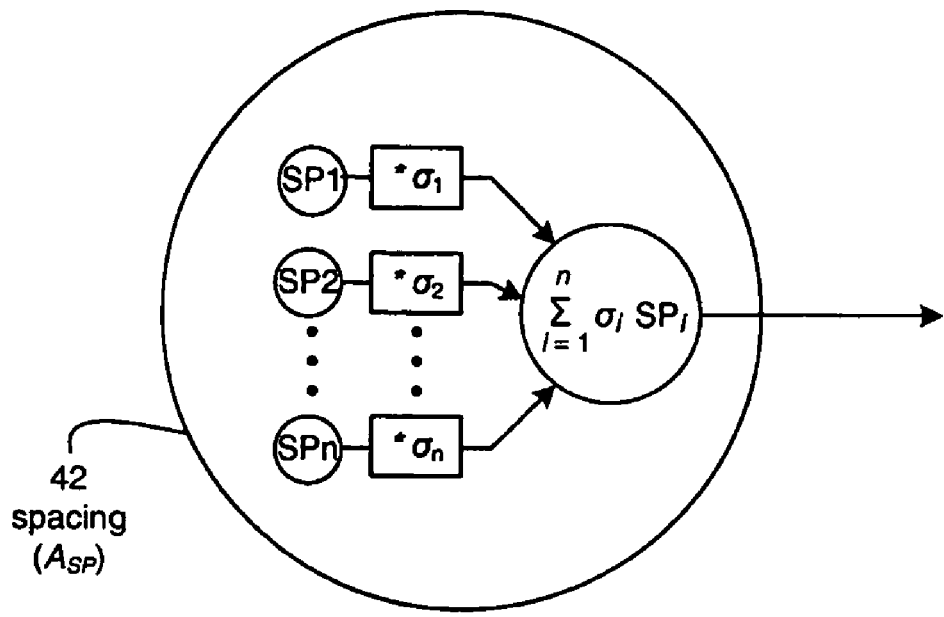

FIG. 12 illustrates calculation of spacing accuracy at node 42. Input samples across multiple input scopes are sorted into sets based on values (or ranges of values) for one or more spacing variables. Collective accuracy is then calculated for each set. The calculated collective accuracy for each set is then provided as an input (SP1, SP2, ... SPn) to the spacing accuracy calculation. Each of these inputs is weighted by a respective weighting factor $\sigma_1$ through $\sigma_n$. Weighting factors $\sigma_1$ through $\sigma_n$ total 1.0. Each weighting factor $\sigma$ represents the relative importance assigned to a particular value for spacing between words across different input scopes, and may be determined in a variety of manners. For example, data may show that a majority of users tend to write with a particular range of spaces between words, and values within that range may be assigned a larger weight. After multiplying by a weighting factor $\sigma$, the collective spacing accuracy SP for each of the sets is summed according to Equation 12.

$$\text{Spacing accuracy (all input scopes)} = A_{SP} \quad \text{(Equation 12)}$$
$$= \sum_{i=1}^{n} \sigma_i SP_i$$

The counter n in Equation 12 corresponds to the number of spacing value sets into which samples are sorted.

Figure 13:
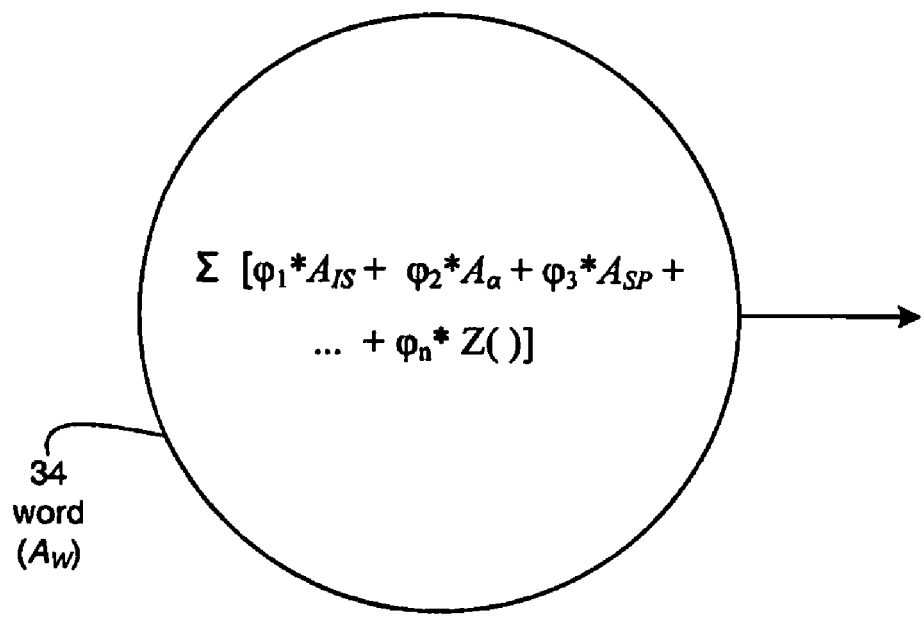

FIG. 13 illustrates calculation of word accuracy $A_W$ at node 34. In particular, node 34 sums the weighted outputs of nodes 38 (input scope accuracy $A_{IS}$), 40 (angle accuracy $A_\alpha$) and 42 (spacing accuracy $A_{SP}$), as shown in Equation 13.

$$A_W = \tau[\phi_1 * A_{IS} + \phi_2 * A_\alpha + \phi_3 * A_{SP} + \ldots + \phi_n * Z()] \quad \text{(Equation 13)}$$

The accuracies $A_{IS}$, $A_\alpha$, and $A_{SP}$ are weighted by respective weight factors $\phi_1$ through $\phi_3$. Each weight $\phi$ corresponds to an importance assigned to a particular accuracy subcomponent of word accuracy $A_W$. If, for example, recognition accuracy varies widely based on spacing between words but varies little based on angle between words, spacing accuracy $A_{SP}$ could be assigned a larger weight relative to angle accuracy $A_\alpha$. Equation 13 includes additional terms beyond those supplied by nodes 38 through 42. In particular, Equation 13 continues with the expansion "+ ... +$\phi_n$*Z()". Other embodiments may have additional subcomponents for word accuracy $A_W$ (shown generically as Z( )) weighted by a separate weighting factor ($\phi_n$). In the embodiment of FIG. 3, there are no other sub-components of word accuracy $A_W$ (i.e., $\phi_4$ through $\phi_n$ equal 0). The values of $\phi_1$ through $\phi_n$ total 1.0.

Figure 14:
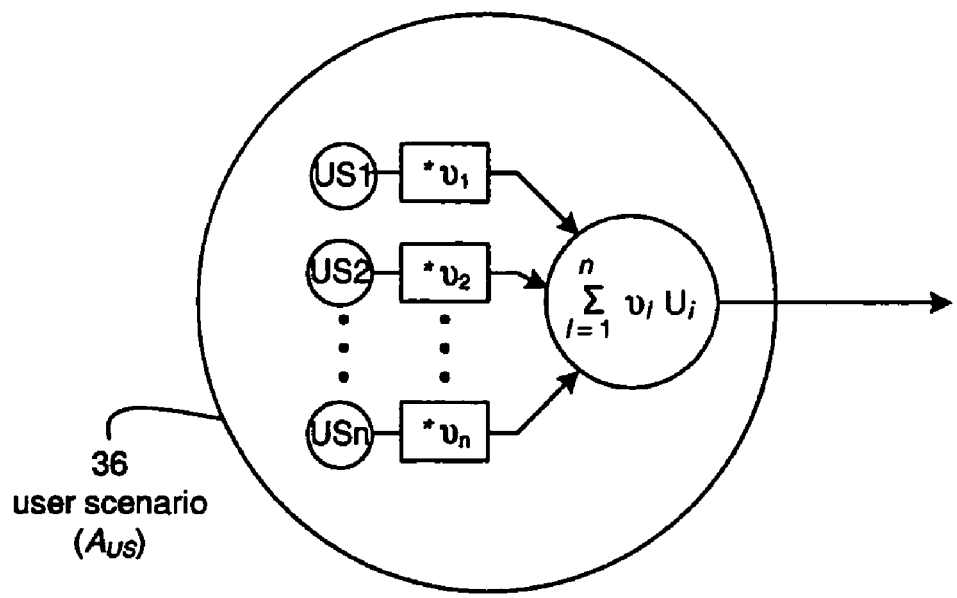

FIG. 14 illustrates calculation of user scenario accuracy $A_{US}$ at node 36. In some embodiments, input samples are sorted into sets based on selected user scenarios. Collective accuracy is then calculated for each set. In some embodiments, accuracy for each set is calculated using Equations 1 through 3. If the scenario involves multiple applications, the original ink provided by the user is compared against the ultimate recognition result provided by the destination application. In other embodiments, other measures of accuracy are used. For example, in a user scenario involving creation and recognition of ink in one application and transfer of the recognition result to another application, accuracy may be measured based on how the recognition result is handled by the subsequent application (e.g., 1 if the recognition result is accepted by the subsequent application, 0 otherwise). In some cases, accuracy is based upon how deep into a list of suggested recognition results a user must go to select the desired result. For example, a recognition result which is at the top of a list of recognizer-suggested results would be given a value of 1.0, the second result on the list given a lower score, the third result on the list given an even lower score, etc.

The collective accuracy for each set (however calculated) is then provided as an input (U1, U2, ... Un) to the user scenario accuracy calculation. Each of these inputs is weighted by a respective weighting factor $v_1$ through $v_n$. Weighting factors $v_1$ through $v_n$ total 1.0. Each weighting factor v represents the relative importance assigned to a particular user scenario, and may be determined in a variety of manners (e.g., usability studies, user questionnaires or other user research, product planning, etc.). As but one example, and assuming 3 possible user scenarios L, M and N, it might be estimated (or empirically determined) that 80% of operations as a whole will be in scenario L, 20% in scenario M and 5% in scenario N, giving respective values for $v_1$, $v_2$ and $v_3$ of 0.80, 0.15 and 0.05. Of course, the weights v need not be based on percentage of operations performed within a particular scenario. As but another example, weights v could be based (in whole or part) upon the critical nature of a particular scenario (e.g., correctly recognizing a prescription in an application designed for general purpose use in a hospital).

After multiplying by a weighting factor v, the collective accuracy U for each user scenario is summed according to Equation 14.

$$A_{US} = \sum_{i=1}^{n} v_i U_i \quad \text{(Equation 14)}$$

The counter n in Equation 14 corresponds to the number of user scenarios for which an accuracy was calculated and input into node 36.

In some embodiments, data used to calculate the user scenario accuracy $A_{US}$ is collected separately from user input sample data used for accuracy evaluation at other nodes. In at least one embodiment, users are asked to provide sample input with little supervision. After data collection, the user scenarios are determined for the samples (by, e.g., software that recorded each software application opened and operation performed during an input).

Figure 15:
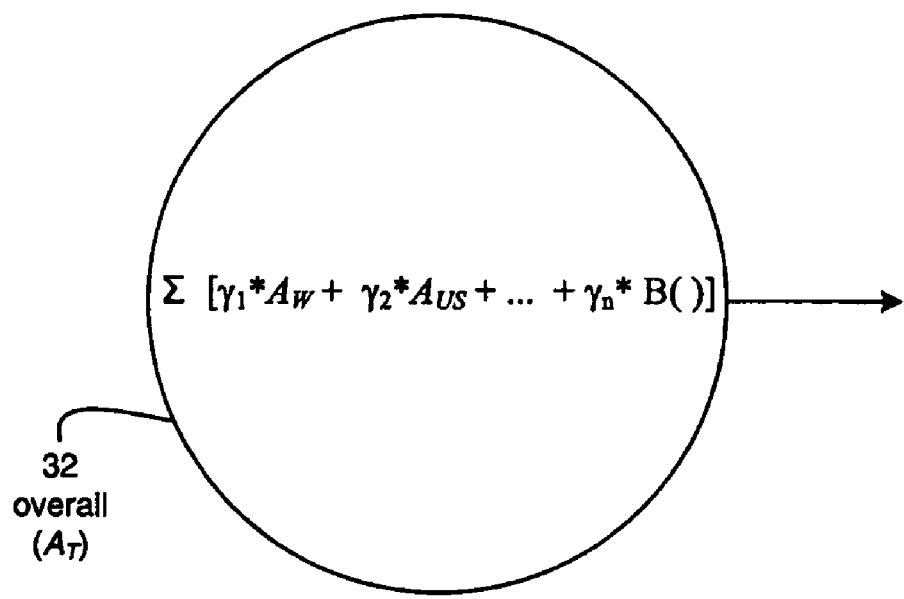

FIG. 15 illustrates calculation of overall accuracy $A_T$ at node 32. In particular, node 32 sums the weighted outputs of nodes 34 (word accuracy $A_W$) and 36 (user scenario $A_{US}$), as shown in Equation 15.

$$A_T = \tau[\gamma_1 * A_W + \gamma_2 * A_{US} + \ldots + \gamma_n * B(\ )] \quad \text{(Equation 15)}$$

The accuracies $A_W$ and $A_{US}$ are weighted by respective weight factors $\gamma_1$ and $\gamma_2$. The values of $\gamma_1$ and $\gamma_2$ total 1.0. Each weight γ corresponds to an importance assigned to a particular accuracy subcomponent of overall accuracy $A_T$. As with other weight factors, these values may be calculated in various manners. As one example, an accuracy model for recognizer intended for use in a software product that will have limited interaction with other software programs could assign a heavier weight of $\gamma_1$ relative to $\gamma_2$ than an accuracy model for a software product which must be integrated with numerous other diverse applications. Weights $\gamma_1$ and $\gamma_2$ could also be developed based on user research and/or on other sources such as previously discussed. Equation 15 includes additional terms beyond those supplied by nodes 34 through 36. In particular, Equation 15 continues with the expansion "+ ... +$\gamma_n$*B( )". Other embodiments may have additional subcomponents for overall accuracy $A_T$ (shown generically as B( )) weighted by a separate weighting factor ($\gamma_n$). In the embodiment of FIG. 3, there are no other sub-components of overall accuracy $A_T$ (i.e., $\gamma_3$ through $\gamma_n$ equal 0). The values $\gamma_1$ for through $\gamma_n$ total 1.0.

In some embodiments, a transforming function is applied to some or all of the nodes of an accuracy model. This may be done in order to simplify a particular accuracy model or its implementation, and/or to prevent a particular accuracy node from being hidden. For example, a particular node may have a relatively small weight. If the accuracy at that node is very poor, the effect on overall accuracy $A_T$ might not be noticed during evaluation of a recognizer. Although the node may have a small relative weight, complete failure of the recognizer under the circumstances corresponding to the node may not be acceptable. Accordingly, a transforming function such as Equation 16 is applied to the output of the node.

$$f(x) = \begin{cases} x, & x \geq x_{Threshold} \\ -M, & x < x_{Threshold} \end{cases} \quad \text{(Equation 16)}$$

Figure 16:
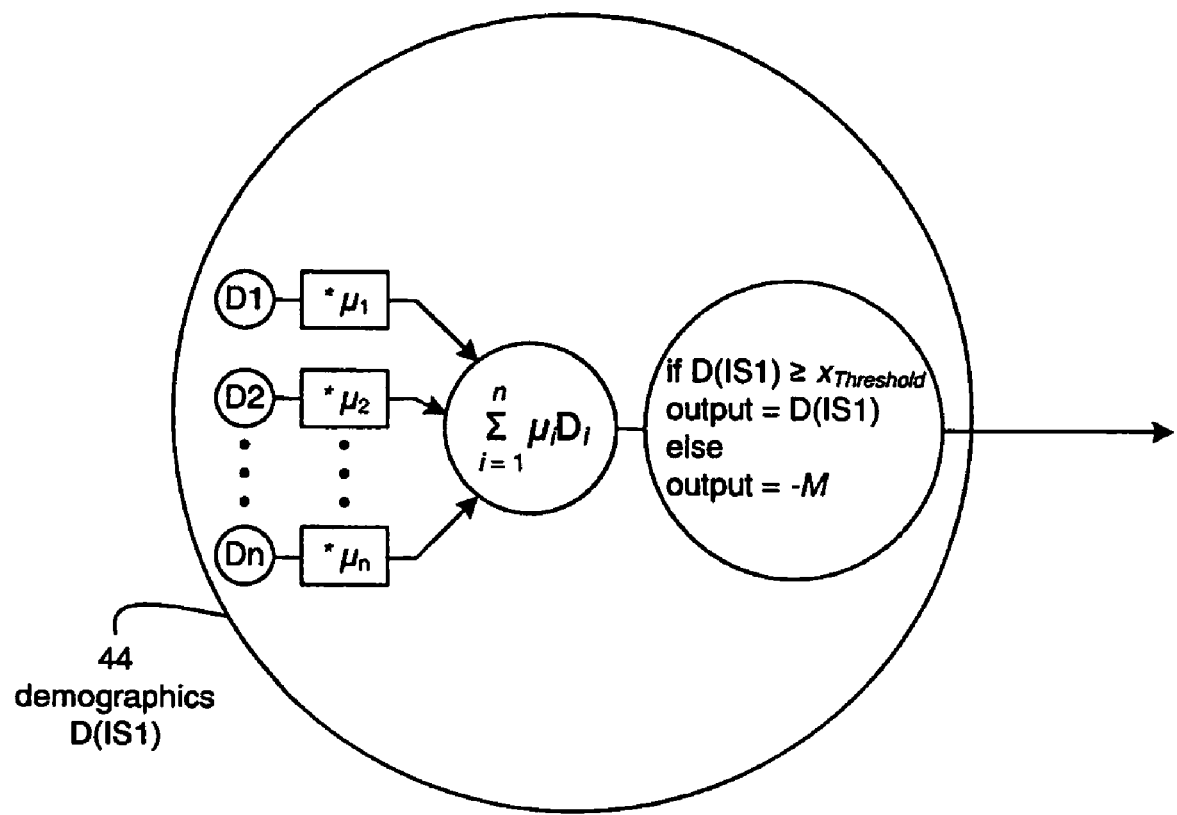
FIG. 16 is a diagram showing application of a transform function to a node of the accuracy model of FIG. 3.

A transforming function such as Equation 16 directly reflects the node sum until the sum decreases below a minimum value $x_{Threshold}$ (which value can be different for every node). If the sum falls below the minimum value, the –M value (a very large number) is propagated through the model to $A_T$. In other words, failure of the node causes the entire recognizer to fail. As an example, it may be decided that a minimum accepted accuracy for e-mail recognition is 0.2. If the sum at the node corresponding to e-mail recognition is 0.1, the recognizer will have a very poor $A_T$, even if all other nodes have excellent recognition results. FIG. 16 illustrates application of a transform function to a node. In the example of FIG. 16, the transforming function is only shown applied to the demographic accuracy subcomponent (node 44) of accuracy model 30. However, a transforming function could be applied in a like manner to some or all of the nodes of an accuracy model. Indeed, transform functions need not be applied to all nodes. In some embodiments, nodes not having a minimum accuracy score simply assign a negative value to $X_{Threshold}$ or use a linear transforming function.

In certain embodiments, each node of an accuracy model also has a confidence score. Those confidence scores can be applied to the nodes to determine an overall confidence score for the entire model. For example, referring to FIG. 4, there may be a 50% confidence level that the demographic group corresponding to input D1 is really a sufficiently large part of a user population to warrant a particular value for weight $\mu_1$. By way of illustration, assume D1 corresponds to right-handed females (per the previous example), that right-handed persons constitute 85% of the population, and that the value assigned to $\mu_1$ is 0.64 (0.85*0.75). However, there may be insufficient data to have complete confidence in the conclusion that right-handed females are really 75% of the intended user population, resulting in only a 50% confidence level in this conclusion. Other inputs and nodes of the model may also have confidence levels less than 100%. For example, input scope 2 may correspond to e-mail addresses. Based on an assumption that users write e-mail addresses 10% of the time they spend writing, $\xi_2$ is given a value of 0.10. However, there may only be a 70% confidence level that users only spend 10% of their total writing time writing e-mail addresses.

To determine an overall confidence score for the entire model, each collective accuracy input (D1-Dn in FIG. 4, S1-Sn in FIG. 5, α1-αn in FIG. 6, C1-Cn in FIG. 7, F1-Fn in FIG. 8, α1-αn in FIG. 11, SP1-SPn in FIG. 12, and US1-USn in FIG. 14) is set to 1. In other words, it is assumed that the recognition engine is 100% accurate. Each weight is then multiplied by its corresponding confidence level. For example, $\mu_1$ is multiplied by 0.50 to yield 0.32 (0.64*0.50), $\xi_2$ is multiplied by 0.70 to yield 0.07 (0.10*0.70), etc. The resulting score at node 32 is an overall confidence level for the model.

The overall confidence score is useful in various ways. As one example, a low overall confidence score and a high $A_T$ indicate that additional data is needed for model validation. As another example, there may be relatively high confidence levels in most of the weighting factors in a model. However, because of insufficient data in one or more selected areas (e.g., in a particular demographic group of interest, with regard to a particular input scope, etc.), some of the weighting factors may have relatively low confidence values. By computing an overall confidence score for the model, it is thus possible to determine whether a relatively low confidence in certain weights causes the entire model to have a low confidence score. If not, the lack of data in those few areas is unlikely to affect the reliability of $A_T$ for the recognizer. If so, the lack of data in those few areas indicates that an $A_T$ computed using the accuracy model is suspect.

Figure 17:
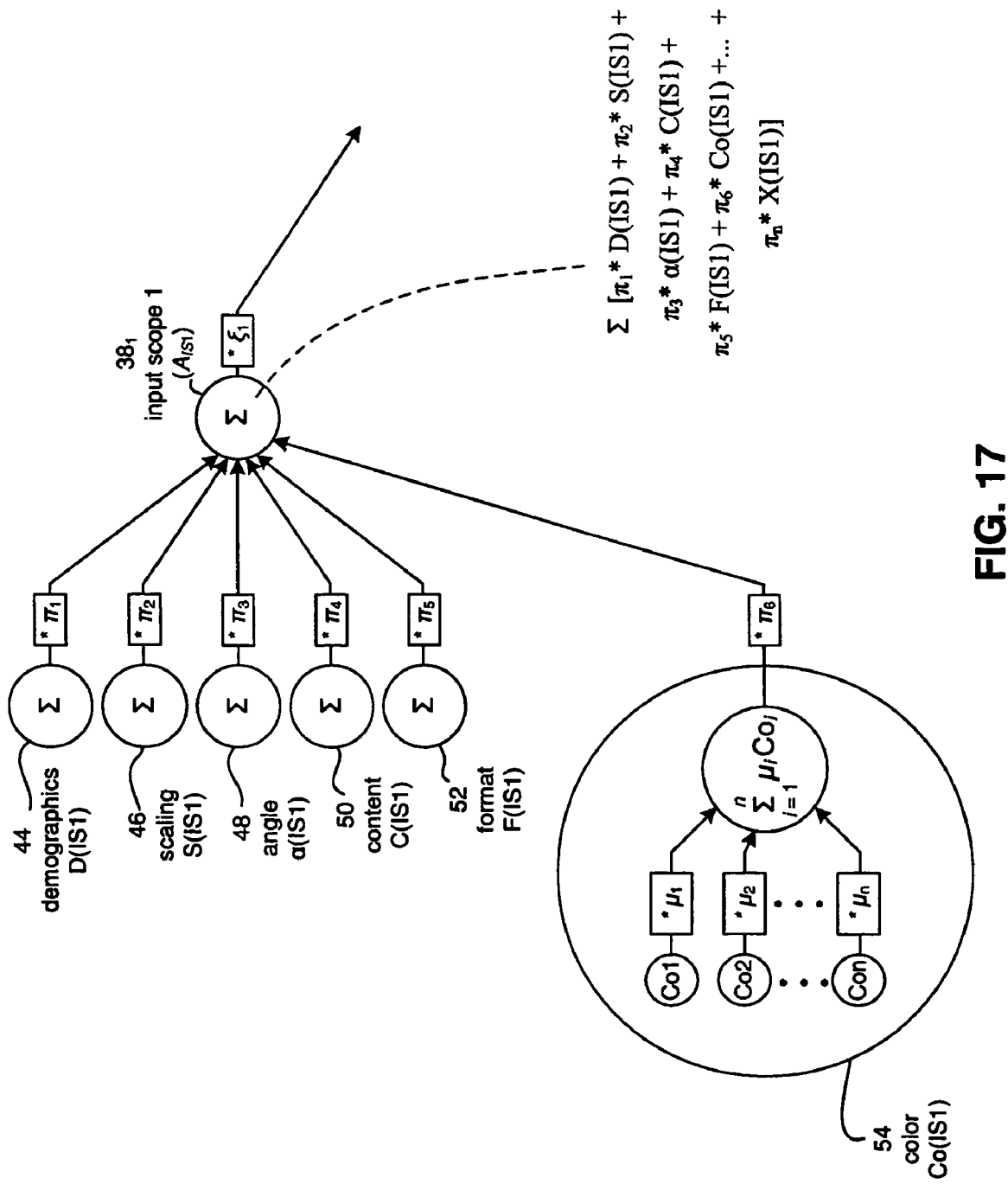
FIGS. 17 and 18 are diagrams showing addition of nodes to an accuracy model according to various embodiments of the invention.
Figure 18:
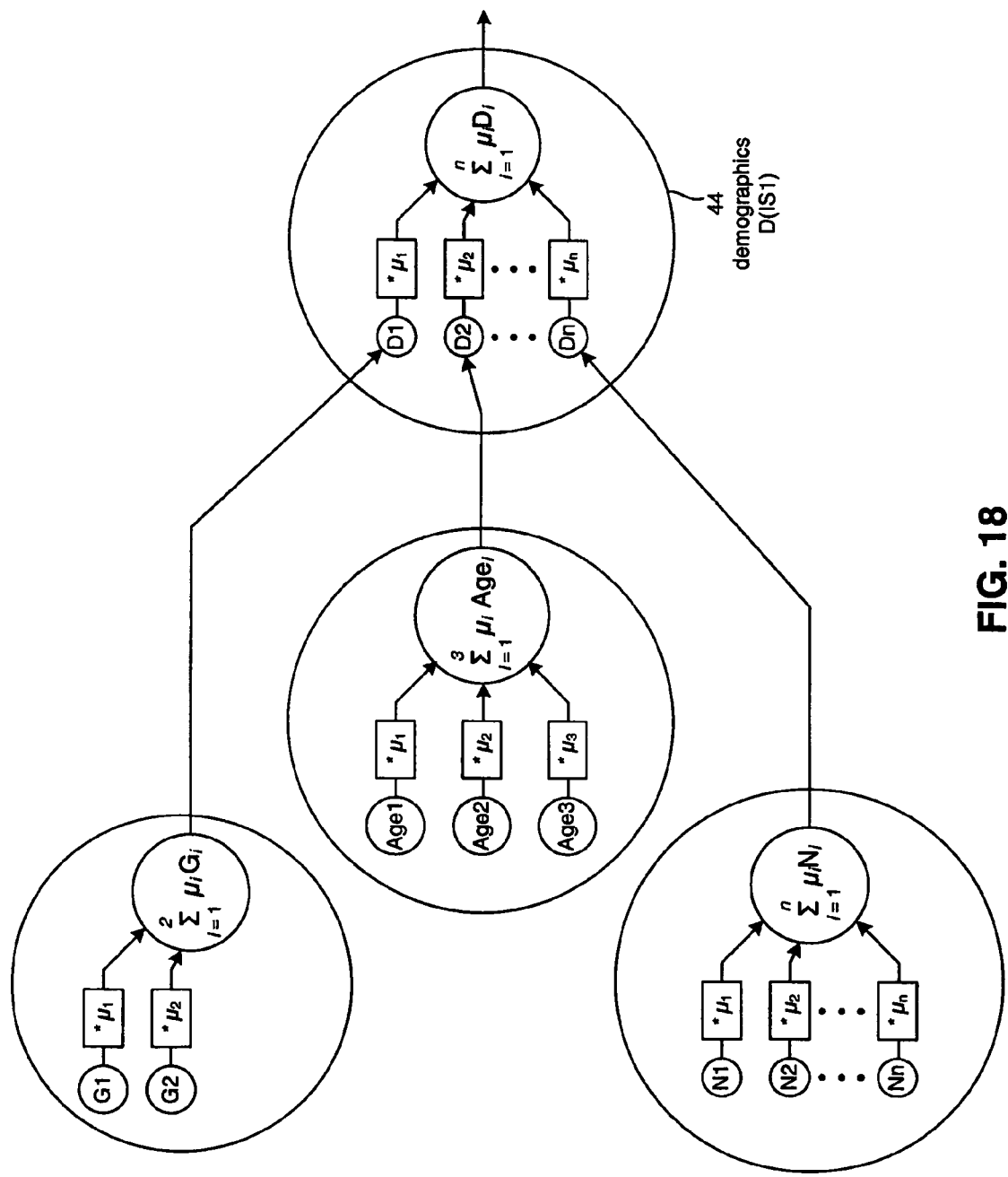

As shown in FIGS. 17 and 18, an accuracy model according to the invention is inherently extensible in at least two ways. As shown in FIG. 17, additional nodes may be added to a particular summing node. Nodes 44, 46, 48, 50 and 52 in FIG. 17 correspond to like-numbered nodes in FIG. 3. However, it is assumed in FIG. 17 that ink color is found to have a non-trivial effect on accuracy for a handwriting recognizer. An additional node 54 is thus added to each input scope to include a color accuracy Co( ) component of each input scope, and a Co(IS) component is included at each of nodes 38₁ through 38ₙ. Other nodes could be added elsewhere in the model in a similar manner.

As shown in FIG. 18, one or more nodes may further be broken out into additional levels of subcomponents. For example, instead of a single node for demographic accuracy D as shown in FIG. 3, one or more of the inputs D1-Dn can represent a weighted sum. By way of illustration, assume that D1 corresponds to a gender demographic, D2 corresponds to an age demographic, and Dn corresponds to a native language demographic. D1 is further broken down by male (G1) and female (G2), which are respectively weighted $\mu_1$ and $\mu_2$. D2 is further broken down by age groups (Age1 for Ages 10-20, Age2 for Ages 20-35, Age3 for Ages 35-50), which are respectively weighted by $\mu_1$, $\mu_2$ and $\mu_3$. Dn is further broken down by specific nationalities (N) weighted by $\mu_1$ through $\mu_n$. Other nodes may be likewise subdivided.

Figure 19:
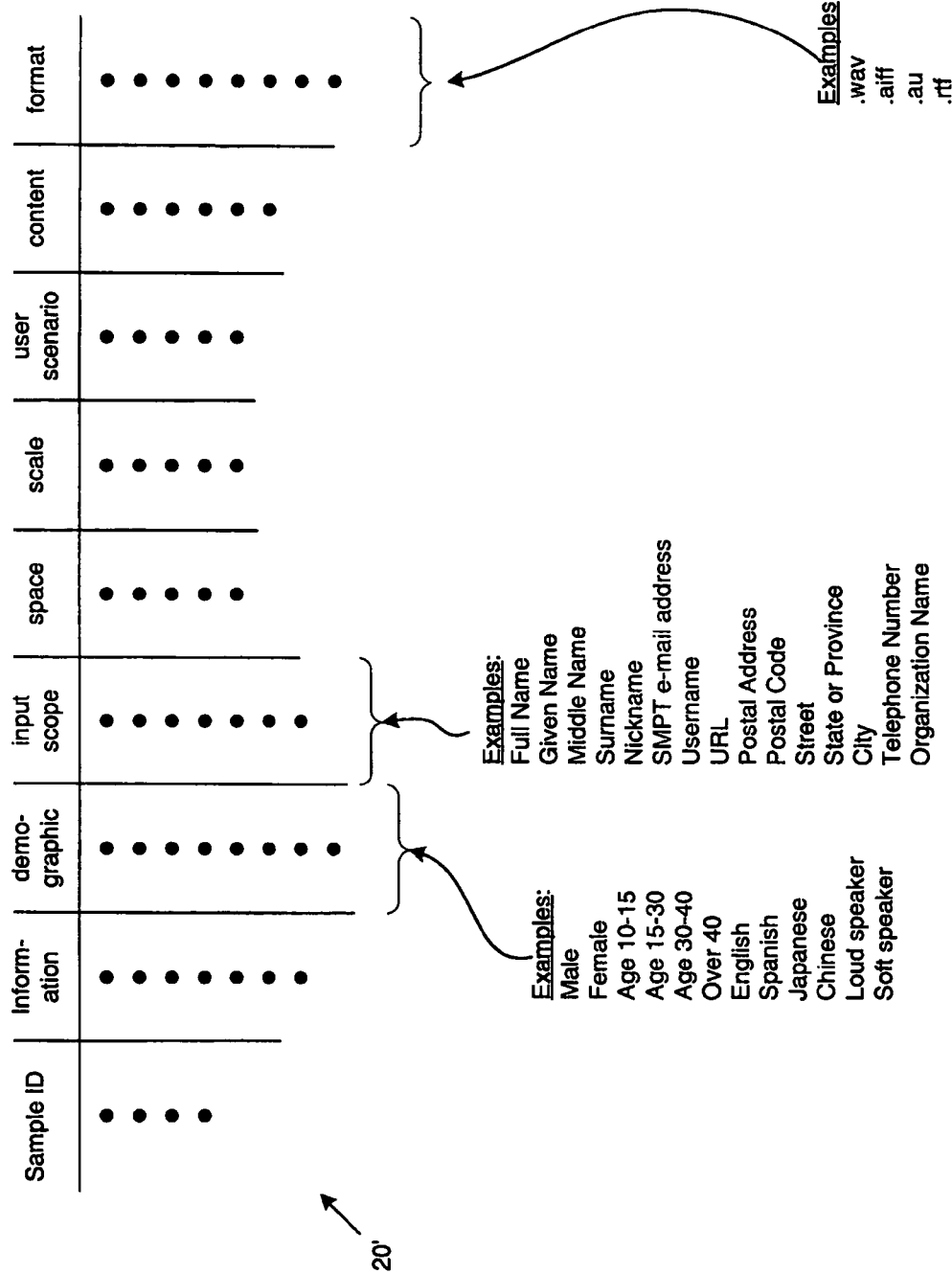
FIG. 19 is a table showing data used in at least one other embodiment of the invention.

As previously described, an accuracy model according to the invention is also usable in connection with other recognition engines. FIG. 19 illustrates a sample database similar to that of FIG. 2, but gives examples of variable values for speech input. Similar to table 20 of FIG. 2, table 20' of FIG. 19 includes a separate row for each input sample, with each column corresponding to a different variable or collection of variables. The first column (Sample ID) corresponds to an identifier for a sample. The second column (Information) corresponds to the actual words the user intended to convey with his or her speech input. The next column (Demographic) contains demographic data about the provider of the input. Although similar in concept to the demographic variable of table 20, the demographic groupings used for handwriting accuracy analysis would not necessarily be used for speech recognition accuracy analysis. For example, it might be determined that certain demographic groups speak less audibly than others.

The next column (Input Scope), similar to the Input Scope column of table 20, also provides the context for the information the user is conveying. As with the demographic variable, the groupings for input scope used in handwriting accuracy analysis would not necessarily be used for speech recognition accuracy analysis. The Space column corresponds to a temporal interval between portions of a speech input (e.g., milliseconds between words, total duration of speech, etc.). The Scale column corresponds to an amount by which the volume of a speech input must be raised or lowered before processing by a recognizer. The user scenario column is similar to the user scenario column of table 20, but would not necessarily contain the same user scenarios. The content column, similar to the content column of table 20, represents various other types of data for a speech sample (e.g., program in which sample provided, particular aspect suggesting user is attempting to more clearly pronounce words, etc.). The format column corresponds to the format in which the sound and/or text component of a speech sample is stored. As in table 20 (FIG. 2), the columns of table 20' are merely examples of data regarding an input sample that may be collected and used for accuracy analysis in an accuracy model according to the invention. In some embodiments, some of the variables in table 20' are not used. In other embodiments, different variables are used.

Figure 20:
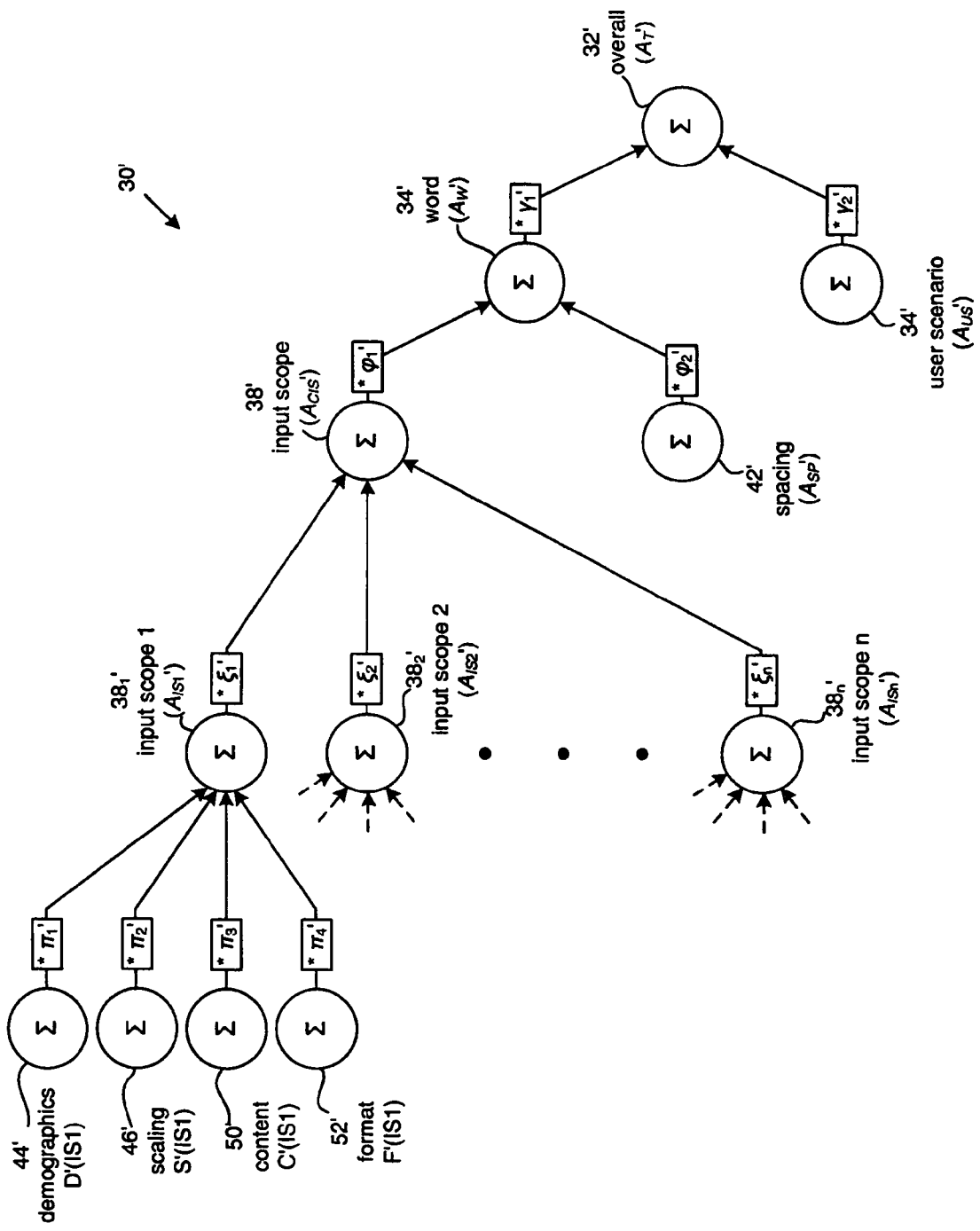
FIG. 20 is an accuracy model according to at least one other embodiment of the invention.

FIG. 20 is an accuracy model 30', according to at least one embodiment of the invention, for analyzing speech recognizer accuracy using the variables of table 20'. Model 30' operates similar to model 30 of FIGS. 3-15. In particular, collective accuracies are computed (using, e.g., Equations 1 through 3) for sample sets sorted by variable values. The collective accuracies are then weighted and summed. In the embodiment of model 30', demographic accuracy D'(IS1), scaling accuracy S'(IS1), content accuracy C'(IS1) and format accuracy F'(IS1) for input scope 1 are calculated using adapted (e.g., substituting $\mu_i'$ for $\mu_i$, etc.) versions of Equations 4, 5, 7 and 8, accuracy for input scope 1 is calculated using an adapted version of Equation 9, etc. Weighting factors ($\mu'$, $\pi'$, $\xi'$, etc.) likewise represent importance assigned to a particular accuracy sub-component, input scope, user scenario, etc.

A transform function (FIG. 16) may be applied to one or more nodes of model 30'. Similarly, confidence scores for the weights of model 30' may also be used to determine an overall confidence score for model 30'.

General Purpose Computing Environment

Figure 21:
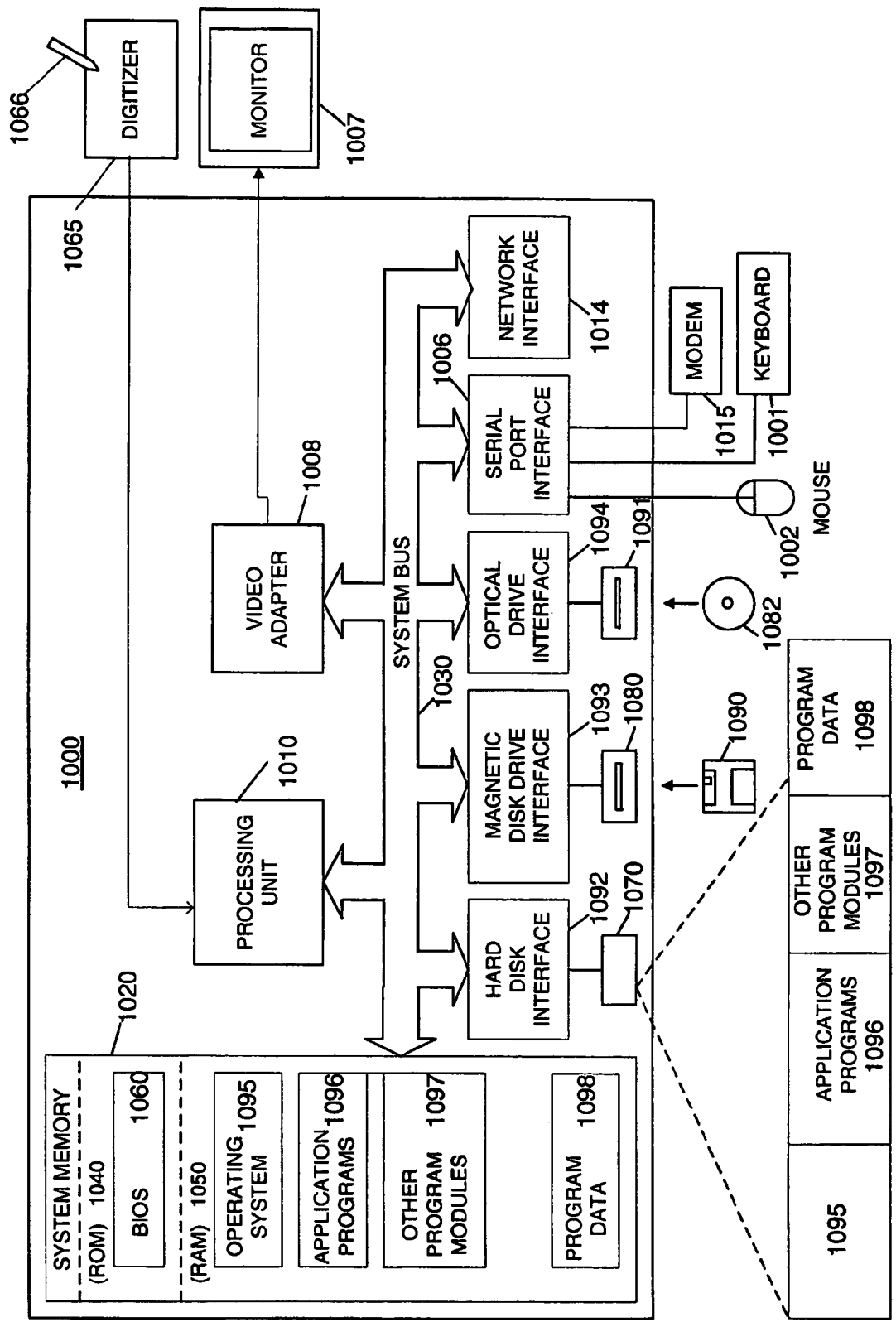
FIG. 21 is a block diagram of a general-purpose digital computing environment that can be used to implement various aspects of the invention.

FIG. 21 illustrates a schematic block diagram of an exemplary conventional general-purpose digital computing environment 1000 that can be used to implement various aspects of the invention. The invention may also be implemented in other versions of computer 1000, such as a Tablet PC. The invention may also be implemented in connection with a multiprocessor system, a network PC, a minicomputer, a mainframe computer, hand-held devices, and the like.

Computer 1000 includes a processing unit 1010, a system memory 1020, and a system bus 1030 that couples various system components including the system memory to the processing unit 1010. The system bus 1030 may be any of various types of bus structures using any of a variety of bus architectures. The system memory 1020 includes read only memory (ROM) 1040 and random access memory (RAM) 1050.

A basic input/output system 1060 (BIOS), which is stored in the ROM 1040, contains the basic routines that help to transfer information between elements within the computer 1000, such as during start-up. The computer 1000 also includes a hard disk drive 1070 for reading from and writing to a hard disk (not shown), a magnetic disk drive 1080 for reading from or writing to a removable magnetic disk 1090, and an optical disk drive 1091 for reading from or writing to a removable optical disk 1082 such as a CD ROM, DVD or other optical media. The hard disk drive 1070, magnetic disk drive 1080, and optical disk drive 1091 are connected to the system bus 1030 by a hard disk drive interface 1092, a magnetic disk drive interface 1093, and an optical disk drive interface 1094, respectively. The drives and their associated computer-readable media provide nonvolatile storage of computer readable instructions, data structures, program modules and other data for computer 1000. It will be appreciated by those skilled in the art that other types of computer readable media may also be used.

A number of program modules can be stored on the hard disk drive 1070, magnetic disk 1090, optical disk 1082, ROM 1040 or RAM 1050, including an operating system 1095, one or more application programs 1096, other program modules 1097, and program data 1098. A user can enter commands and information into the computer 1000 through input devices such as a keyboard 1001 and/or a pointing device 1002. These and other input devices are often connected to the processing unit 1010 through a serial port interface 1006 that is coupled to the system bus, but may be connected by other interfaces, such as a parallel port, game port, a universal serial bus (USB) or a BLUETOOTH interface. A monitor 1007 or other type of display device is also connected to the system bus 1030 via an interface, such as a video adapter 1008.

In one embodiment, a pen digitizer 1065 and accompanying pen or stylus 1066 are provided in order to digitally capture freehand input. Although a direct connection between the pen digitizer 1065 and the processing unit 1010 is shown, in practice, the pen digitizer 1065 may be coupled to the processing unit 1010 via a serial port, parallel port or other interface and the system bus 1030, as known in the art. Furthermore, although the digitizer 1065 is shown apart from the monitor 1007, the usable input area of the digitizer 1065 is often co-extensive with the display area of the monitor 1007. Further still, the digitizer 1065 may be integrated in the monitor 1007, or may exist as a separate device overlaying or otherwise appended to the monitor 1007.

CONCLUSION

Although specific examples of carrying out the invention have been described, those skilled in the art will appreciate that there are numerous variations and permutations of the above described systems and techniques that fall within the spirit and scope of the invention as set forth in the appended claims. As but one example, one or more nodes of the model 30 or model 30' (or of another accuracy model) are rearranged in some embodiments. By way of illustration, a spacing accuracy SP may be calculated for specific input scopes, and/or a demographic accuracy D may be calculated across all input scopes. An accuracy model according to the invention could also be used to measure the improvement in overall accuracy after a particular recognizer has been "personalized," i.e. modified for use by a specific user. If one or more words or phrases have a special importance (such that they must be correctly recognized for a recognizer to be considered accurate), those words or phrases can be assigned separate nodes and transforming functions applied to those nodes. These and other modifications are within the scope of the invention as defined by the attached claims.

The invention claimed is:

1. A method for evaluating a computer learning signal processing engine, comprising:
    employing at least one processor to execute computer-executable instructions stored on at least one computer-readable medium to perform the following acts:
        identifying a first group of signal sets representing inputs by humans, each signal set of the first group having an associated range of values for a variable corresponding to the first group, the variable being one of a plurality of variables having values characterizing multiple signals to be processed, the plurality of variables including at least a variable characterizing a user scenario in which a signal was generated, the user scenario including at least one of a software application or an operation performed within a software application;
        calculating an accuracy score for each signal set of the first group using the signal processing engine to be evaluated;
        applying weight factors to the accuracy scores for the first group signal sets, each weight factor representing a relative importance of one of the associated ranges of values for the first variable;
        summing weighted accuracy scores for the first group of signal sets to yield a first summed accuracy score;
        identifying additional groups of signal sets, each group having a corresponding variable of the plurality of variables, each signal set of a group having an associated range of values for the corresponding variable;
        calculating accuracy scores for each signal set of each additional group using the signal processing engine to be evaluated;
        applying weight factors to the accuracy scores for the signal sets of the additional groups;
        summing the weighted accuracy scores within each of the additional groups to yield additional summed accuracy scores;
        using summed accuracy scores from at least two separate training sets comprising samples, wherein each separate training set is distinguished by a feature characteristic identified based upon a demographic characteristic associated with a source of the samples, to create one or more signal processing engines to handle multiple applications to one or more new groups of signal sets for which a frequency of the feature characteristic of the separate training sets are known or assumed, by weighting the summed accuracy score associated with each training set according to the frequency and then combining the weighted summed accuracy scores to yield scone-specific accuracy scores;
        applying weights to each of the scope-specific accuracy scores;
        summing the weighted scope-specific accuracy scores to yield a combined accuracy score;

summing the combined accuracy score with at least one other summed accuracy score relating to a physical attribute of one or more input signals to yield an input accuracy score; and summing the input accuracy score with a summed accuracy score for a group of signal sets corresponding to the user scenario variable to yield an overall accuracy score.

2. The method of claim 1, wherein at least some of the associated ranges of values are single values.

3. The method of claim 1, wherein combining the summed accuracy scores comprises:

applying weight factors to a plurality of the summed accuracy scores, each of the weight factors representing a relative importance of the variable corresponding to the group from which a different one of the plurality of summed accuracy scores was derived, and summing the plurality of weighted summed accuracy scores to yield a subsequent sum.

4. The method of claim 3, wherein combining the summed accuracy scores further comprises:

applying additional weight factors to the subsequent sum and to at least one of the summed accuracy scores, the additional weight factors representing the relative importance of at least one variable corresponding to groups from which the subsequent sum was derived and of the variable corresponding to the group from which the at least one summed accuracy score was derived, and summing the additionally weighted subsequent sum and the additionally weighted at least one summed accuracy score.

5. The method of claim 3, further comprising:

identifying an additional variable having values characterizing multiple signals to be processed;

identifying another group of signal sets, each signal set of the group having an associated range of values for the additional variable;

calculating an accuracy score for each signal set of the additional variable group using the signal processing engine to be evaluated;

applying weight factors to the accuracy scores for the additional group signal sets, each weight factor representing a relative importance of one of the associated ranges of values for the additional variable;

summing weighted accuracy scores for additional group signal sets to yield an additional summed accuracy score;

applying weight factors to the plurality of the summed accuracy scores and to the additional summed accuracy score, each of the weight factors representing a relative importance of the variable corresponding to the group from which a different one of the plurality of summed accuracy scores was derived or of the additional variable, and summing the plurality of weighted summed accuracy scores and the weighted additional accuracy score.

6. The method of claim 1, further comprising selecting a variable of the plurality of variables;

selecting sub-variables, each sub-variable having a range of values for a value of the selected variable;

calculating an accuracy score for signal sets in groups of signal sets corresponding to the sub-variables, each of the signal sets within a group corresponding to a range of values for the corresponding sub-variable;

applying weights to the accuracy scores for the signal sets in each sub-variable group and summing the weighted scores within each of said groups to yield sub-variable accuracy scores; and applying weights to the sub-variable accuracy scores and summing the weighted sub-variable accuracy scores.

7. The method of claim 1, wherein:

at least one variable is a source variable having values characterizing a source of at least one of the signals to be processed, at least one variable is a context variable having values characterizing the context of at least one of the signals to be processed, and at least one variable is a physical variable having values characterizing physical attributes of at least one of the signals to be processed.

8. The method of claim 1, wherein:

the signal processing engine to be evaluated comprises handwriting recognition software, the signals to be processed comprise handwriting samples, values of the source variable comprise demographic data regarding users creating handwriting samples, values of the context variable comprise data regarding the context of handwriting samples, and values of the physical variable comprise at least one of data regarding the scaling of a handwriting sample, data regarding the relative angle of components of a handwriting sample, or data regarding the spacing between components of a handwriting sample.

9. The method of claim 8, wherein:

the groups of signal sets comprise:

groups of demographic signal sets, each demographic signal set in a group having an associated range of values for the source variable and the same value for the context variable, groups of scaling signal sets, each scaling signal set in a group having an associated range of values for the scaling of a handwriting sample and the same value for the context variable, and groups of angle signal sets, each angle signal set in a group having an associated range of values for at least one angle of a component of a handwriting sample and the same value for the context variable, at least the summed accuracy scores for demographic signal set, scaling signal set and angle signal set groups of signals having a common context variable value are weighted and summed to yield the scope-specific accuracy scores, the scope-specific scores are weighted and summed to yield the combined accuracy score, the combined accuracy score and at least one other summed accuracy score are weighted and summed to yield a word accuracy score, and at least the word accuracy score and a summed accuracy score for a group corresponding to the user scenario variable are weighted and summed to yield the overall accuracy score.

10. The method of claim 1, wherein:

the signal processing engine to be evaluated comprises speech recognition software, the signals to be processed comprise speech samples, values of the source variable comprise demographic data regarding users creating speech samples, values of the context variable comprise data regarding the context of speech
samples, and
values of the physical variable comprise at least one of data regarding the scaling of a speech sample or data regarding the spacing between components of a speech sample.

11. The method of claim 10, wherein:
the groups of signal sets comprise:
groups of demographic signal sets, each demographic signal set in a group having an associated range of values for the source variable and the same value for the context variable, and
groups of scaling signal sets, each scaling signal set in a group having an associated range of values for the scaling of a speech sample and the same value for the context variable,
at least the summed accuracy scores for demographic signal set and scaling signal set groups of signals having a common context variable value are weighted and summed to yield the scope-specific accuracy scores,
the scope-specific accuracy scores are weighted and summed to yield the combined accuracy score,
the combined accuracy score and at least one other summed accuracy score are weighted and summed to yield a word accuracy score, and
at least the word accuracy score and a summed accuracy score for a group corresponding to the user scenario variable are weighted and summed to yield the overall accuracy score.

12. The method of claim 1, further comprising applying a transforming function to a sum.

13. The method of claim 12, wherein the transform function comprises:
outputting the sum when the sum is above a threshold, and
outputting number having a large absolute value when the sum is not above the threshold.

14. The method of claim 1, further comprising: setting accuracy scores for signal sets to equal 1; applying confidence scores to weight factors; and calculating an overall confidence score.

15. A computer-readable storage medium having stored thereon data representing sequences of instructions which, when executed by a processor, cause the processor to perform steps comprising:
identifying a first group of signal sets representing inputs by humans, each signal set of the first group having an associated range of values for a variable corresponding to the first group, the variable being one of a plurality of variables having values characterizing multiple signals to be processed, the plurality of variables including at least a variable characterizing a user scenario in which a signal was generated, the user scenario including at least one of a software application or an operation performed within a software application;
calculating an accuracy score for each signal set of the first group using a signal processing engine to be evaluated;
applying weight factors to the accuracy scores for the first group signal sets, each weight factor representing a relative importance of one of the associated ranges of values for the first variable;
summing weighted accuracy scores for first group signal sets to yield a first summed accuracy score;
identifying additional groups of signal sets, each group having a corresponding variable of the plurality, each signal set of a group having an associated range of values for the corresponding variable;
calculating accuracy scores for each signal set of each additional group using the signal processing engine to be evaluated;
applying weight factors to the accuracy scores for the signal sets of the additional groups, the weight factors within each of the additional groups representing a relative importance of associated ranges of values for the variable corresponding to the group;
summing the weighted accuracy scores within each of the additional groups to yield additional summed accuracy scores;
using summed accuracy scores from at least two separate training sets comprising samples, each separate training set is identified by a feature characteristic determined based upon a demographic characteristic associated with a source of the samples, to create one or more signal processing engines to handle multiple applications to one or more new groups of signal sets for which a frequency of the feature characteristic of the separate training sets are known or assumed, by weighting the summed accuracy score associated with each training set according to the frequency and then combining the weighted summed accuracy scores to yield scope-specific accuracy scores;
applying weights to each of the scope-specific accuracy scores;
summing the weighted scope-specific accuracy scores to yield a combined accuracy score;
summing the combined accuracy score with at least one other summed accuracy score relating to a physical attribute of one or more input signals to yield an input accuracy score; and
summing the input accuracy score with a summed accuracy score for a group of signal sets corresponding to the user scenario variable to yield an overall accuracy score.

16. The computer-readable storage medium of claim 15, wherein at least some of the associated ranges of values are single values.

17. The computer-readable storage medium of claim 15, wherein combining the summed accuracy scores comprises:
applying weight factors to a plurality of the summed accuracy scores, each of the weight factors representing a relative importance of the variable corresponding to the group from which a different one of the plurality of summed accuracy scores was derived, and
summing the plurality of weighted summed accuracy scores to yield a subsequent sum.

18. The computer-readable storage medium of claim 17, wherein combining the summed accuracy scores further comprises:
applying additional weight factors to the subsequent sum and to at least one of the summed accuracy scores, the additional weight factors representing the relative importance of at least one variable corresponding to groups from which the subsequent sum was derived and of the variable corresponding to the group from which the at least one summed accuracy score was derived, and
summing the additionally weighted subsequent sum and the additionally weighted at least one summed accuracy score.

19. The computer-readable storage medium of claim 17, comprising additional data representing sequences of instructions which, when executed by a processor, cause the processor to perform additional steps comprising:
identifying an additional variable having values characterizing multiple signals to be processed;

identifying another group of signal sets, each signal set of the group having an associated range of values for the additional variable;

calculating an accuracy score for each signal set of the additional variable group using the signal processing engine to be evaluated;

applying weight factors to the accuracy scores for the additional group signal sets, each weight factor representing a relative importance of one of the associated ranges of values for the additional variable;

summing weighted accuracy scores for additional group signal sets to yield an additional summed accuracy score;

applying weight factors to the plurality of the summed accuracy scores and to the additional summed accuracy score, each of the weight factors representing a relative importance of the variable corresponding to the group from which a different one of the plurality of summed accuracy scores was derived or of the additional variable, and summing the plurality of weighted summed accuracy scores and the weighted additional accuracy score.

20. The computer-readable storage medium of claim 15, comprising additional data representing sequences of instructions which, when executed by a processor, cause the processor to perform additional steps comprising:

selecting a variable of the plurality;

selecting sub-variables, each sub-variable having a range of values for a value of the selected variable;

calculating an accuracy score for signal sets in groups of signal sets corresponding to the sub-variables, each of the signal sets within a group corresponding to a range of values for the corresponding sub-variable;

applying weights to the accuracy scores for the signal sets in each sub-variable group and summing the weighted scores within each of said groups to yield sub-variable accuracy scores; and applying weights to the sub-variable accuracy scores and summing the weighted sub-variable accuracy scores.

21. The computer-readable storage medium of claim 15, wherein:

at least one variable is a source variable having values characterizing a source of at least one of the signals to be processed, at least one variable is a context variable having values characterizing the context of at least one of the signals to be processed, and at least one variable is a physical variable having values characterizing physical attributes of at least one of the signals to be processed.

22. The computer-readable storage medium of claim 15, wherein:

the signal processing engine to be evaluated comprises handwriting recognition software, the signals to be processed comprise handwriting samples, values of the source variable comprise demographic data regarding users creating handwriting samples, values of the context variable comprise data regarding the context of handwriting samples, and values of the physical variable comprise at least one of data regarding the scaling of a handwriting sample, data regarding the relative angle of components of a handwriting sample or data regarding the spacing between components of a handwriting sample.

23. The computer-readable storage medium of claim 22, wherein:

the groups of signal sets comprise:

groups of demographic signal sets, each demographic signal set in a group having an associated range of values for the source variable and the same value for the context variable, groups of scaling signal sets, each scaling signal set in a group having an associated range of values for the scaling of a handwriting sample and the same value for the context variable, and groups of angle signal sets, each angle signal set in a group having an associated range of values for at least one angle of a component of a handwriting sample and the same value for the context variable, at least the summed accuracy scores for demographic signal set, scaling signal set and angle signal set groups of signals having a common context variable value are weighted and summed to yield the scope-specific accuracy scores, the scope-specific accuracy scores are weighted and summed to yield the combined accuracy score, the combined accuracy score and at least one other summed accuracy score are weighted and summed to yield a word accuracy score, and at least the word accuracy score and a summed accuracy score for a group corresponding to the user scenario variable are weighted and summed to yield the overall accuracy score.

24. The computer-readable storage medium of claim 15, wherein:

the signal processing engine to be evaluated comprises speech recognition software, the signals to be processed comprise speech samples, values of the source variable comprise demographic data regarding users creating speech samples, values of the context variable comprise data regarding the context of speech samples, and values of the physical variable comprise at least one of data regarding the scaling of a speech sample or data regarding the spacing between components of a speech sample.

25. The computer-readable storage medium of claim 24, wherein:

the groups of signal sets comprise:

groups of demographic signal sets, each demographic signal set in a group having an associated range of values for the source variable and the same value for the context variable, and groups of scaling signal sets, each scaling signal set in a group having an associated range of values for the scaling of a speech sample and the same value for the context variable, at least the summed accuracy scores for demographic signal set and scaling signal set groups of signals having a common context variable value are weighted and summed to yield the scope-specific accuracy scores, the scope-specific accuracy scores are weighted and summed to yield the combined accuracy score, the combined accuracy score and at least one other summed accuracy score are weighted and summed to yield a word accuracy score, and at least the word accuracy score and a summed accuracy score for a group corresponding to the user scenario variable are weighted and summed to yield the overall accuracy score.

26. The computer-readable storage medium of claim 15, comprising additional data representing sequences of instructions which, when executed by a processor, cause the processor to perform additional steps comprising applying a transforming function to a sum.

27. The computer-readable storage medium of claim 26, wherein the transform function comprises:
   outputting the sum when the sum is above a threshold, and
   outputting number having a large absolute value when the sum is not above the threshold.

28. The computer-readable storage medium of claim 15, comprising additional data representing
   sequences of instructions which, when executed by a processor, cause the processor to perform additional steps comprising:
   setting accuracy scores for signal sets to equal 1;
   applying confidence scores to weight factors; and
   calculating an overall confidence score.

* * * * *

UNITED STATES PATENT AND TRADEMARK OFFICE
CERTIFICATE OF CORRECTION

PATENT NO. : 7,580,570 B2 Page 1 of 1
APPLICATION NO. : 10/730113
DATED : August 25, 2009
INVENTOR(S) : Manu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1329 days.

Signed and Sealed this

Fourteenth Day of September, 2010

David J. Kappos
*Director of the United States Patent and Trademark Office*